(12) United States Patent
Goldman et al.

(10) Patent No.: US 9,021,582 B2
(45) Date of Patent: Apr. 28, 2015

(54) PARALLELIZED PATTERN MATCHING USING NON-DETERMINISTIC FINITE AUTOMATA

(75) Inventors: Gary Goldman, Los Altos, CA (US);
Philip A. Thomas, San Jose, CA (US);
Ramesh Panwar, Pleasanton, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 2463 days.

(21) Appl. No.: 11/739,365

(22) Filed: Apr. 24, 2007

(65) Prior Publication Data

US 2008/0271141 A1    Oct. 30, 2008

(51) Int. Cl.
*G06F 11/00* (2006.01)
*H04L 29/06* (2006.01)

(52) U.S. Cl.
CPC ........ *H04L 63/0245* (2013.01); *H04L 63/1416* (2013.01)

(58) Field of Classification Search
CPC .. H04L 63/1416; H04L 63/1408; H04L 63/14
USPC ..................................................... 726/22, 23
See application file for complete search history.

(56) References Cited

U.S. PATENT DOCUMENTS

| | | | |
|---|---|---|---|
| 7,260,558 B1 * | 8/2007 | Cheng et al. ................... | 706/12 |
| 7,558,925 B2 | 7/2009 | Bouchard et al. | |
| 7,685,637 B2 | 3/2010 | Zhao et al. | |
| 2002/0124187 A1 * | 9/2002 | Lyle et al. ..................... | 713/201 |
| 2004/0059443 A1 * | 3/2004 | Sharangpani .................. | 700/48 |
| 2006/0085389 A1 | 4/2006 | Flanagan et al. | |
| 2006/0101195 A1 | 5/2006 | Jain | |
| 2006/0120137 A1 | 6/2006 | Gould et al. | |
| 2006/0136570 A1 * | 6/2006 | Pandya ......................... | 709/217 |

FOREIGN PATENT DOCUMENTS

| | | |
|---|---|---|
| WO | WO 2003/023553 A2 | 3/2003 |
| WO | WO 2006/031659 A2 | 3/2006 |

OTHER PUBLICATIONS

"Assisting Network Intrusion Detection with Reconfigurable Hardware" by B. L. Hutchings and R. Franklin and D. Carver, Department of Electrical and Computer Engineering Brigham Young University, Provo, UT published by IEEE 2002, 10 pages.*

Baker et al., "Automatic Synthesis of Efficient Intrusion Detection Systems on FPGAs," *IEEE Transactions on Dependable and Secure Computing*, vol. 3, No. 4, Oct.-Dec. 2006, pp. 289-300.

(Continued)

*Primary Examiner* — Ellen Tran
(74) *Attorney, Agent, or Firm* — Shumaker & Sieffert, P.A.

(57) ABSTRACT

This disclosure describes techniques of determining whether a symbol stream includes a pattern defined by a regular expression. As described herein, the regular expression may be represented using a non-deterministic finite automaton (NFA). A plurality of states in the NFA may be evaluated in parallel. These states may be associated with a plurality of symbol positions in a symbol stream. Evaluating a plurality of states and symbols in parallel may allow for faster determinations of whether the symbol stream includes the pattern defined by the regular expression.

38 Claims, 10 Drawing Sheets

(56) References Cited

OTHER PUBLICATIONS

Sourdis et al., "Fast, Large-Scale String Match for a 10Gbps FPGA-Based Network Intrusion Detection System," 13th International Conference onField-Programmable Logic and Applications, *FPL 2003 proceedings*, (lecture notes in Computer Science vol. 2778), pp. 880-889, Sep. 2003.

Dharmapurikar et al., "Fast and Scalable Pattern Matching for Content Filtering," Symposium on Architecture for Networking and Communications Systems, ACS 2005, Oct. 26, 2005, pp. 183-192.

Hutchings et al., "Assisting Network Intrusion Detection with Reconfigurable Hardware," *Proceedings of the 10th Annual IEEE Symposium on Field-Programmable Custom Computing Machines*, Apr. 22-24, 2002, pp. 111-120.

Stoyanov et al., "Resolving Non-Determinism in NFA," International Conference on Computer Systems and Technologies, Jul. 9, 2003, 5 pgs.

Sutton, "Partial Character Decoding for Improved Regular Expression Matching in FPGAs," Proceedings of the 2004 IEEE International Conference on Field-Programmable Technology, Dec. 6-8, 2004, pp. 25-32.

University of Alaska, "Finite Automata," Aug. 20, 2005, 48 pgs., http://www.math.uaa.alaska.edu/-afkjm/cs351/handouts/finite-automata.ppt.

European Search Report from European Application No. 07253056.1, dated Sep. 3, 2009, 3 pgs.

Z. Shan et al., "A Network State Based Intrusion Detection Model," Proceedings of the 2001 International Conference on Computer Networks and Mobile Computing (ICCNMC'01), Oct. 16, 2001, pp. 481-486.

U.S. Appl. No. 11/738,059, filed Apr. 20, 2007, entitled, "Network Attack Detection Using Partial Deterministic Finite Automaton Pattern Matching," Ma et al.

Navarro, "A Partial Deterministic Automaton for Approximate String Matching," In Proc. 4th South American Workshop on String Processing (WSP197), pp. 112-127, 1997.

Office Action from U.S. Appl. No. 11/738,059, dated Jul. 7, 2010, 21 pp.

Response to Office Action dated Jul. 7, 2010, from U.S. Appl. No. 11/738,059, filed Oct. 7, 2010, 22 pp.

Notification of First Office Action for Chinese Application No. 200710135741.0 dated Sep. 21, 2010, 11 pp.

\* cited by examiner

PARALLELIZED PATTERN MATCHING USING NON-DETERMINISTIC FINITE AUTOMATA

TECHNICAL FIELD

The invention relates to computer networks and, more particularly, to network security.

BACKGROUND

An enterprise computer network typically includes a collection of interconnected computing devices that exchange data and share resources. The devices may include, for example, web servers, database servers, file servers, routers, printers, end-user computers and other devices. The variety of devices may execute a myriad of different services and communication protocols. Each of the different services and communication protocols exposes the enterprise network to different security vulnerabilities.

Conventional techniques for detecting network attacks use pattern matching. For example, an enterprise may deploy one or more security devices that inspect network traffic for viruses or other security threats. The security device typically applies regular expressions or sub-string matches to the network traffic to detect defined patterns within a protocol stream. Multiple patterns may be used in an attempt to detect different types of attacks and generally improve the accuracy and robustness of the attack detection.

SUMMARY

In general, this disclosure describes techniques for determining whether a symbol stream includes a pattern defined by a regular expression. As described herein, the techniques represent the regular expressions using one or more non-deterministic finite automata (NFA). Moreover, the techniques may be used to evaluate a plurality of states in the NFA in parallel. These states may be evaluated with respect to a plurality of different symbols in a symbol stream. Parallel evaluation of the NFA states may allow for faster and more efficient detection of network attacks, i.e., determination of whether the symbol stream includes any of the patterns defined by the regular expressions.

For example, an Intrusion Detection and Prevention (IDP) device may use a representation of an NFA that accepts symbol streams that conform to patterns associated with computer security threats. The IDP device may include a hardware-based pattern matching module that may maintain a set of node vectors. Each of the node vectors may be temporarily associated with a symbol position in a symbol stream, i.e., a location within that symbol stream. For example, in the symbol stream "abcdefg", the symbol 'a' is at a first symbol position within the symbol stream, the symbol 'b' is at a second symbol position within the symbol stream, and so on. Unless otherwise stated herein, the terms "first symbol position", "second symbol position", etc. may identify any symbol positions within a symbol stream. For example, the term "first symbol position" may refer to a symbol position that is ten symbol positions after the beginning of a symbol stream.

Furthermore, each of the node vectors may specify a set of nodes in the representation of the NFA corresponding to the node vector's current symbol position. That is, for a given node vector, the specified nodes represent nodes that have been evaluated, are being evaluated, or are unevaluated for the particular symbol position associated with the node vector. In addition to the node vectors, the pattern matching module of the IDP device may include a plurality of threads. Each of the threads is a hardware component that operates to evaluate nodes specified by the node vectors. Because the NFA may validly have multiple current nodes, the threads may evaluate the multiple current nodes in parallel. When a thread evaluates a node, the thread may update one of the node vectors to specify additional nodes or may output an indicator that identifies a particular pattern to which the symbol stream conforms.

In one embodiment, a method comprises maintaining a non-deterministic finite automaton (NFA) representation that includes a plurality of nodes. The NFA representation represents an NFA that detects whether a symbol stream conforms to a symbol pattern defined by a regular expression. In addition, the method comprises receiving a symbol stream. The method also comprises determining whether the symbol stream conforms to the symbol pattern defined by the regular expression by concurrently evaluating a first node of the NFA representation with a first thread while evaluating a second node of the NFA representation with a second thread. Furthermore, the method comprises communicating data in the symbol stream via a computer network when the symbol stream does not conform to the pattern defined by the regular expression.

In another embodiment, a device comprises a memory unit that stores a non-deterministic finite automaton (NFA) representation that includes a plurality of nodes. The NFA representation represents an NFA that detects whether a symbol stream conforms to a symbol pattern defined by a regular expression. The device also comprises a pattern matching module that determines whether a symbol stream conforms to the symbol pattern defined by the regular expression by concurrently evaluating a first node of the NFA representation with a first thread and evaluating a second node of the NFA representation with a second thread. The device also comprises a network interface that communicates data in the symbol stream via a computer network when the symbol stream does not conform to the pattern defined by the regular expression.

In another embodiment, a computer-readable medium comprises instructions. The instructions cause a programmable processor to maintain a non-deterministic finite automaton (NFA) representation that includes a plurality of nodes. The NFA representation represents an NFA that detects whether a symbol stream conforms to a symbol pattern defined by a regular expression. The instructions also cause the programmable processor to receive a symbol stream. In addition, the instructions also cause the programmable processor to determine whether the symbol stream conforms to the symbol pattern defined by the regular expression by concurrently evaluating a first node of the NFA representation with a first thread while evaluating a second node of the NFA representation with a second thread. Furthermore, the instructions cause the programmable processor to communicate data in the symbol stream via a computer network when the symbol stream does not conform to the pattern defined by the regular expression.

The details of one or more embodiments of the invention are set forth in the accompanying drawings and the description below. Other features, objects, and advantages of the invention will be apparent from the description and drawings, and from the claims.

DETAILED DESCRIPTION

In general, this disclosure describes techniques for determining whether a symbol stream includes a pattern defined by a regular expression. As described herein, the techniques represent the regular expression using a non-deterministic finite automaton (NFA) having a plurality of states that may be evaluated in parallel. These states may be associated with a plurality of symbols in a symbol stream. Evaluating the plurality of states and symbols in parallel may allow for faster determinations of whether the symbol stream includes the pattern defined by the regular expression and, therefore, represent a network attack or other security threat.

Figure 1:
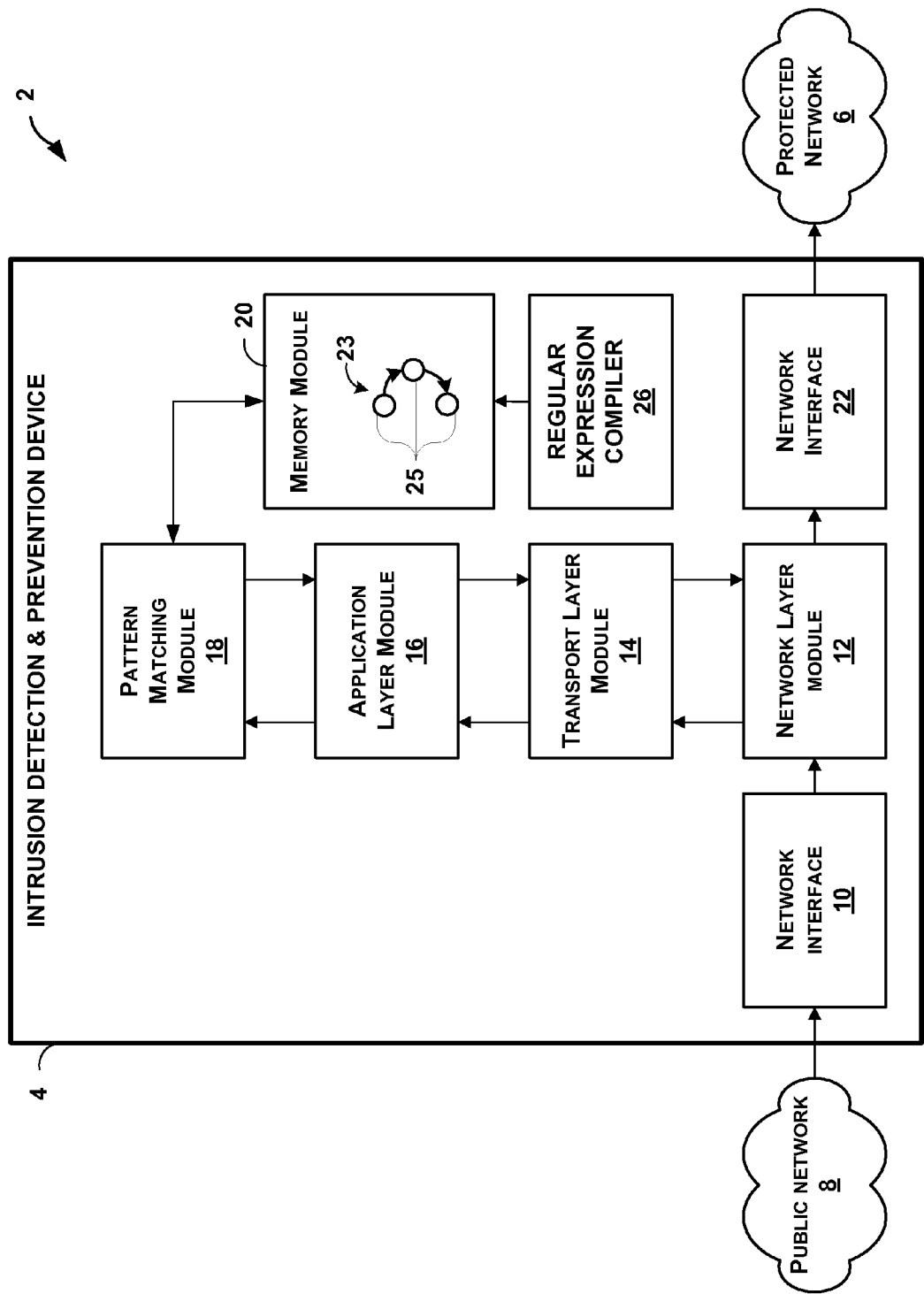
FIG. 1 is a block diagram illustrating an exemplary system that includes an Intrusion Detection and Prevention (IDP) device, a protected network, and a public network.

FIG. 1 is a block diagram illustrating an exemplary system 2 that includes an Intrusion Detection and Prevention (IDP) device 4, a protected network 6, and a public network 8. Public network 8 may be an unsecured wide-area network, such as the Internet, a wireless network, a local-area network, or another type of computer network. Protected network 6 may be a secured computer network such as a local-area network in an office or a network data center.

In system 2, IDP device 4 is connected to public network 8 and protected network 6 such that network traffic flowing from public network 8 to protected network 6 flows first to IDP device 4. IDP device 4 may be a stand-alone network appliance, a component of another network appliance (e.g., a firewall appliance), a software module that executes on a network appliance, or another configuration. In general, IDP device 4 inspects network traffic from public network 8 and determines whether the network traffic includes any computer security threats. A computer security threat is an attempt to gain access to sensitive information, an attempt to disrupt the operation of an organization, or another type of attack. Example computer security threats include computer viruses, spyware, rootkits, attempts to guess passwords, phishing emails, requests associated with a denial of service attack, and other types of attack.

If IDP device 4 determines that a given stream of network traffic does not include any computer security threats, IDP device 4 may communicate the stream of network traffic to protected network 6. Otherwise, if IDP device 4 determines that the stream includes one or more computer security threats, IDP device 4 may drop the network traffic, log the network traffic, and/or forward the traffic to a traffic analyzer for further analysis. In this way, IDP device 4 may prevent network traffic that includes computer security threats from reaching protected network 6.

As illustrated in the example of FIG. 1, IDP device 4 may contain a plurality of components. This disclosure illustrates these components only for purposes of explanation. In some cases, IDP device 4 may include fewer than the components illustrated in FIG. 1, and in other cases, IDP device 4 may include more than the components illustrated in FIG. 1. Moreover, the functionality of these components as described herein may be distributed among separate components or devices.

When network traffic from public network 8 arrives at IDP device 4, a first network interface 10 may process the physical signals from public network 8 and output link layer frames to a network layer module 12. In a packet-based network, network layer module 12 typically processes the link layer frames in order to produce streams of network packets having common source and destination addresses.

A transport layer module 14 may use each of these streams of network packets to produce flows of transport layer segments. For example, transport layer module 16 may produce one or more flows of Transmission Control Protocol (TCP) segments for each stream of network packets. For example, transport layer module 14 may assemble and output a flow of Internet Protocol (IP) packets based on the link layer frames. IP packets are generally considered part of the same packet flow when the IP packets share a common source address, destination address, source port, destination port, and protocol, although more or less granular flows may be considered. In some implementations, the functionality of network layer module 12 and transport layer module 14 may be combined in order to identify flows of network packets in one action. These transport layer segments may be used, in turn, by an application layer module 16.

Application layer module 16 may assemble the TCP segments to form application-layer data and extract application layer communications from the data. Application layer module 16 may include one or more protocol-specific plug-in modules that extract application layer communications for various application layer protocols. For example, application layer module 16 may include a plug-in module that extracts Hypertext Transfer Protocol (HTTP) communications from TCP segments, a plug-in module that extracts Session Initiation Protocol (SIP) communications from TCP segments, and plug-in modules that extract communications in other application layer protocols. Other examples of application-layer communication protocols that application layer module 16 may support include the File Transfer Protocol (FTP), the Network News Transfer Protocol (NNTP), the Simple Mail Transfer Protocol (SMTP), Telnet, Domain Name System (DNS), Gopher, Finger, the Post Office Protocol (POP), the Secure Socket Layer (SSL) protocol, the Lightweight Directory Access Protocol (LDAP), Secure Shell (SSH), Internet Message Access Protocol (IMAP), Server Message Block (SMB), Dynamic Host Configuration Protocol (DHCP), and other protocols.

Application layer module 16 may analyze the application-layer communications and extract protocol-specific elements in the form of symbol strings. As used herein, the term "application layer elements" refers to protocol-specific symbol strings obtained at the application-layer. For example, application layer module 16 may extract protocol-specific "contexts" and "values" from the reassembled application layer communications. In general, "contexts" are named elements within a stream of application layer messages that uniquely identifies various types of application layer elements. The named elements provide an application layer basis for describing a communication session. Examples of contexts include file names, user names, application names, names of attached documents, protocol-specific header information, protocol-specific authorization data, form data, and other information that describes the communication session. As a particular example, a context for an HTTP protocol stream may include the name of a server providing the HTTP service and the name of the type of web browser (e.g., "Internet Explorer") accessing the server. By reassembling application layer communications, application layer module 16 may extract specific contexts (e.g., browser type) and corresponding values (e.g., "Internet Explorer"). Application layer module 16 may output such application layer elements as parts of the streams of symbols. For example, application layer module 16 may output a symbol stream that comprises a set of symbols that represent an application layer element followed by a set of symbols that represent an application layer communication. After application layer module 16 forms the streams of symbols, application layer module 16 may forward the symbol streams to a pattern matching module 18.

Pattern matching module 18 may determine whether a symbol stream includes one or more patterns of symbols associated with one or more computer security threats. A pattern of symbols associated with a computer security threat is referred to herein as a "threat signature." If pattern matching module 18 determines that a symbol stream includes a threat signature, pattern matching module 18 may output search results to application layer module 16. These search results may include pattern identifiers that indicate which threat signature was detected. In addition, these search results may include an index that indicates a position in the symbol stream where the threat signature began or ended. When application layer module 16 receives the search results, application layer module 16 may cause transport layer module 14 to drop packets associated with the symbol stream, divert packets associated with the symbol stream to another destination, or perform some other action. Otherwise, if pattern matching module 18 does not detect a threat signature in the symbol stream, application layer module 16 may cause transport layer module 14 to communicate packets associated with the symbol stream to protected network 6 using network layer module 12 and a second network interface 22.

In order to determine whether a stream of symbols includes a threat signature, pattern matching module 18 may use a set of regular expressions that describe the patterns of symbols. A regular expression is a string that describes a set of strings, according to certain syntax rules. For example, the regular expression "(a|b)*cd?e" describes a set of strings that begin with any number of "a" or "b" symbols, which is always followed by a "c" symbol, which may or may not be followed a "d" symbol, which is always followed by an "e" symbol. For instance, the set of strings described by this regular expression include "abcde", "bacde", "ababce", "ce", and so on. Regular expressions may include empty strings denoted by the letter $\epsilon$ (epsilon). For example, the string "ab$\epsilon\epsilon\epsilon$cde" is the same as the string "abcde" because $\epsilon$ is an empty string.

Every possible regular expression may be represented as a non-deterministic finite automaton (i.e., a "NFA"). In general, a finite automaton is a model of behavior composed of a finite number of states, transitions between those states, and actions. An NFA is a finite automaton that is non-deterministic in that, for each pair of state and input symbols, there may be several possible next states. During execution, an NFA consumes a stream of symbols. That is, for each symbol in the stream of symbols, the NFA transitions to a new state until all of the symbols are consumed, i.e., evaluated. In an NFA, it is also possible to transition to a new state without consuming any symbols in the stream of symbols. Such a transition is referred to as an epsilon-transition because only the empty string $\epsilon$ is "consumed" during the transition. Because an NFA may transition to a state without consuming a symbol, the NFA may have multiple valid current states. When an NFA consumes a symbol in the symbol stream, the NFA may "accept" the symbol stream as belonging to a set of strings defined by a regular expression represented by the NFA. An NFA accepts the stream of symbols when one of the current states of the NFA is an accepting state or the NFA may make one or more $\epsilon$-transitions from one of the current states of the NFA to an accepting state. As this disclosure explains in detail below, because an NFA may be validly in multiple current states, these multiple current states may be evaluated in parallel.

IDP device 4 may store an NFA representation 23 in memory module 20. NFA representation 23 may represent a NFA. In NFA representation 23, each non-accepting state may be represented as one or more nodes 25. Each of nodes 25 may be a data structure that maps one or more symbols to one or more next-state elements. For example, one of nodes 25 may map the symbol 'a' to a next-state element in the node. These symbols may include letters, digits, control characters, Unicode symbols, punctuation marks, symbols in Cyrillic or other non-Latin alphabets or character sets, binary symbols, and other types of symbols. Furthermore, as this disclosure explains in detail below, these symbols may include meta-symbols that describe classes of symbols.

A next-state element may be a 16-bit value that indicates an accepting or a non-accepting state in the NFA. If a next-state element indicates a non-accepting state of the NFA, the next-state element may contain a node index. A node index is a value from which a memory address of a node may be derived. For example, a node index may be a 15-bit value. The memory address of a node may be derived from a node index by left shifting a node index by two positions and by adding a base address. If a next-state element indicates an accepting state in the NFA, a next-state element may include a pattern identifier that specifies a pattern of symbols described by the regular expression.

Each of nodes 25 in NFA representation 23 may be either a state node or a map node. A state node may map a limited number of symbols to a single next-state element. Because a next-state element may indicate a node in NFA representation 23, a state node may map a limited number of symbols to a single node in NFA representation 23. A map node may provide, for each symbol in a set of symbols, a mapping from one of the symbols to a next-state element in a set of next-state elements in the map node. For the same reason, a map node may provide, for each symbol in a set of symbols, a mapping from one of the symbols to one of the nodes in NFA representation 23.

NFA representation 23 may include several types of state nodes. These types may include list state nodes, range state nodes, and masked-test state nodes. A list state node maps one or more symbols to a single next-state element. A range state node maps symbols that fall within a contiguous range of values to a single next-state element. For instance, a range node may specify a high range value, a low range value, and a next-state element. A symbol satisfies the symbol criteria of a range state node when the current symbol is greater than or equal to the low range value and less than or equal to the high range value. A masked-test state node maps symbols to a single next-state element when a logical 'AND' operation over the symbol and an arbitrary bit mask results in a value that equals a specified value. For example, a masked-test state node may include a mask, a value, and a next-state element. A symbol satisfies the symbol criteria of a mask-test state node when the resulting value of a bitwise AND operation over the current symbol and the mask matches the value specified in the masked-test state node.

A state node in NFA representation 23 may include one epsilon-transition to a second node in NFA representation 23. This second node may be a state node or a map node. If the second node is a state node, the second node may include one epsilon-transition to a third node in the NFA representation 23, and so on. In this way, NFA representation 23 may include a chain of nodes in which one node is linked to another node through epsilon-transitions. This disclosure may refer to such chains of nodes as epsilon chains.

NFA representation 23 may use epsilon chains to represent a state in an NFA that includes transitions to multiple states. For example, a first state in an NFA may map the symbol 'a' to a second state and may map the symbol 'b' to a third state. In this example, NFA representation 23 may include a first state node that represents the first state, a second node that represents the second state, and a third node that represents the third state. In addition, NFA representation 23 may include a fourth node that does not represent a state in the NFA. The first node may map the symbol 'a' to a next-state element that includes a node index of the second node. In addition, the first node may specify an epsilon-transition to the fourth node. The fourth node may map the symbol 'b' to a next-state element that includes a node index of the third node.

A regular expression compiler 26 may compile a regular expression into a NFA representation 23. When regular expression compiler 26 compiles a regular expression, regular expression compiler 26 may position the nodes in an epsilon chain in consecutive memory locations in memory module 20. Because nodes in an epsilon chain are located in consecutive memory locations, these nodes may be retrieved using a single memory read request. Consequently, nodes in an epsilon chain may be present in a cache and therefore may be returned quickly. For example, a first node may include an epsilon transition to a second node and the second node may include an epsilon transition to a third node. Each of these nodes may be stored in consecutive memory locations. Therefore, when the first node is requested, memory module 20 may return the first node, the second node, and the third node. When memory module 20 returns the nodes, a cache may store a copy of the first node, the second node, and the third node. Consequently, when the second node is requested, the cache may return the second node. This may be significantly faster than returning the second node from memory module 20.

A map node may provide, for each symbol in a set of symbols, a mapping from the symbol to a next-state element in a set of next-state elements in the map node. A map node may be a useful substitute for a long epsilon chain. For example, regular expression compiler 26 may create a single map node rather than creating an epsilon chain that includes eight or more state nodes.

Map nodes may conform to a bitmap compression scheme that reduces the size of each map node. For example, a map node may include a bitmap portion and a set of one or more next-state elements. In this example, the bitmap portion includes a set of bits. Each of the bits is associated with one symbol in a set of symbols. If the bit associated with a symbol is set to '1', the map node maps the symbol to one of the next-state elements in the map node. If the bit associated with the symbol is set to '0', the map node does not map the symbol to a next-state element that is actually in the map node. Rather, if the bit associated with the symbol is set to '0', the map node maps the symbol to a "logical" next-state element. This "logical" next-state element specifies a node index of a "dead" state of the NFA. This "logical" next-state element is not actually in the map node, but its existence is implied for a symbol when the bit associated with the symbol is set to '0'. In general, typical map nodes in NFA representation 23 specify transitions to the "dead" state for most symbols. By not including actual next-state elements for each of these transitions to the "dead" state, each of the map nodes may be significantly smaller. This disclosure provides an example format of a map node in regards to FIG. 3, below.

NFA representation 23 may also include an unanchored map node. The regular expressions for many symbol patterns are of the form ".*<X>", where <X> is a string of symbols. A symbol stream that matches such symbol patterns may begin with an unlimited sequence of any symbols followed by a sequence of symbols identified by <X>. For example, a string of symbols X associated with a computer virus may be embedded in the middle of the symbol stream. In other words, the identifying string of symbols is not "anchored" within the symbol stream at a certain position from the beginning of the symbol stream. Like an ordinary map node, the unanchored map node may provide, for each symbol in a set of symbols, a mapping between the symbol and a next-state element in the map node. Pattern matching module 18 may maintain a set of node vectors. Each of these node vectors may comprise one or more hardware registers located within pattern matching module 18. Pattern matching module 18 may temporarily associate different symbol positions in a set of consecutive symbol positions with different ones of the node vectors. For example, if pattern matching module 18 maintains a set of five node vectors, pattern matching module 18 may temporarily associate the fourth, fifth, sixth, seventh, and eighth symbol positions in a symbol stream with respective node vectors. Aside from the last symbol position associated with a node vector, each of the symbol positions associated with the node vectors may constitute a symbol window. Continuing the previous example, the fourth, fifth, sixth, and seventh symbol positions may constitute the symbol window. For example, in the symbol stream "abcdefghij" the symbols 'd', 'e', 'f', and 'g' are at symbol positions within the symbol window. Furthermore, each of the node vectors may specify ones of nodes 25 that have been evaluated, are currently being evaluated, or are unevaluated.

When node vectors associated with symbol positions in the symbol window specify nodes that are unevaluated, pattern matching module 18 assign these nodes to different threads. These threads may be implemented in hardware or software. Each of these threads may operate in parallel to evaluate the assigned nodes. When pattern matching module 18 assigns a node specified by a node vector to a thread, the thread may retrieve the node from memory module 20. The thread may then evaluate the node with respect to the symbol in the symbol stream at the symbol position associated the node vector to determine whether the node maps the symbol to a next-state element of the node. If the node maps the symbol to a next-state element that includes a node index, the thread may update the node vector associated with the next symbol position to include this node index as an unevaluated node. If the node maps the symbol to a next-state element that includes a pattern identifier, thereby indicating that a pattern has been detected, the thread may provide the pattern identifier to application layer module 16. In this way, the threads update the node vectors in real-time as pattern matching module 18 proceeds through a symbol stream.

When the node vector associated with the first symbol position in the symbol window only specifies nodes that pattern matching module 18 has evaluated and includes no nodes that are currently being evaluated, or unevaluated, pattern matching module 18 may advance the symbol window. When pattern matching module 18 advances the symbol window, the node vector that was associated with the first symbol position in the symbol window may become the node vector associated with the symbol position that follows the last symbol position in the symbol window. In this way, pattern matching module 18 may reuse node vectors.

The techniques described in this disclosure may provide one or more advantages. For example, pattern matching module 18 may evaluate several symbol positions in a symbol stream concurrently. Evaluating several symbol positions concurrently may lead to faster overall processing of the symbol stream. Furthermore, pattern matching module 18 may evaluate several states in the NFA in a single cycle. For example, blocks of state nodes may be arranged within memory module 20 in sequential locations. Consequently, pattern matching module 18 may be able to retrieve and evaluate entire blocks of state nodes while only incurring the costs associated with a single memory read. In another example, a representation of a NFA may be significantly smaller than a representation of an equivalent deterministic finite automaton (DFA) for detecting the same security threats. For this reason, IDP device 4 may store a representation of an NFA that accepts symbol strings that conform to a larger number of different patterns in the same amount of memory space as compared to an equivalently sized DFA. In other words, IDP device 4 may be able to use an NFA to detect significantly more types of security threats than by using a deterministic finite automaton of a similar size. In another example, because an NFA may validly have multiple current states, IDP device 4 may evaluated these multiple current states in parallel. In a further example, the NFA representation presented in this disclosure may exhibit significant temporal and spatial memory locality of the nodes visited. For this reason, pattern matching module 18 may more effectively utilize memory caching techniques to improve performance.

Figure 2A:
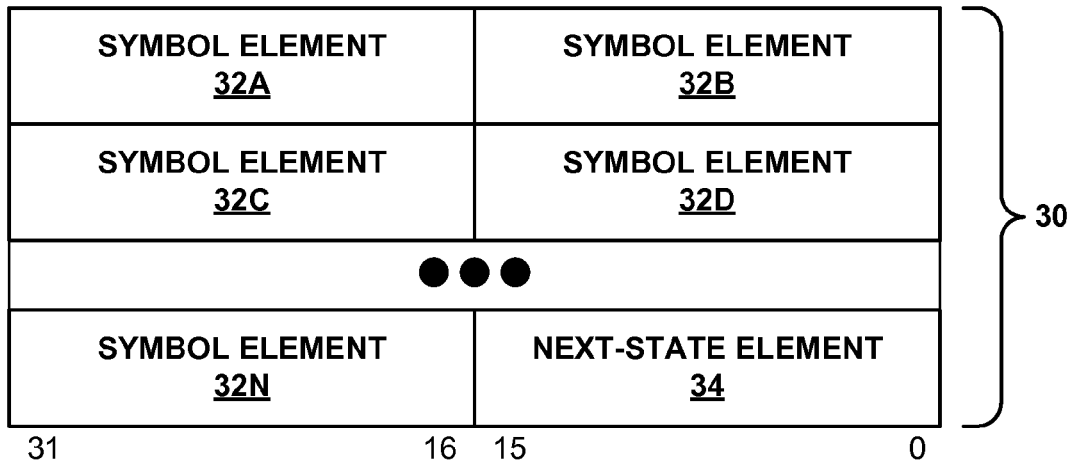
FIG. 2A is a block diagram illustrating an exemplary format of a list state node.

FIGS. 2A-2C and FIG. 3 illustrate exemplary formats of different types of nodes used to represent a non-deterministic finite automaton, such as NFA 23 of FIG. 1. Specifically, FIG. 2A is a block diagram illustrating an exemplary format of a list state node 30. In this example, list state node 30 includes a set of symbol elements 32A through 32N and a next-state element 34. Symbol elements 32A through 32N may be referred to collectively herein as "symbol elements 32." Each of symbol elements 32 may specify a set of symbol criteria. In general, list state node 30 maps symbols conforming to the symbol criteria in symbol elements 32 to next-state element 34.

In one example representation, each of symbol elements 32 includes a symbol and a set of flags. For example, bits 15:8 of symbol elements 32 may contain the symbol and bits 7:2 may contain a set of flags. Bits 1:0 may be reserved. Table 1 presented below illustrates an exemplary format for a symbol element:

TABLE 1

| FIELD | BITS | DESCRIPTION |
| --- | --- | --- |
| C | 15:8 | Symbol |
| M | 7 | Meta-symbol flag |
| U | 6 | Unicode flag |
| N | 5 | Negation flag |

TABLE 1-continued

| FIELD | BITS | DESCRIPTION |
| --- | --- | --- |
| E | 4 | Epsilon flag |
| B | 3 | Epsilon-bar flag |
| L | 2 | Last flag |
| — | 1:0 | Reserved |

In the example format presented in Table 1, the Unicode flag indicates whether the symbol is a Unicode symbol. For instance, if the Unicode flag is set to '1', list state node 30 may map a current symbol that matches the symbol in field C to next-state element 34. In addition, if the Unicode flag is set to '1', list state node 30 may also map a current symbol that is a zero byte ("\0") and a next symbol that matches the symbol in field C to next-state element 34.

The negation flag indicates match negation. For example, if the negation flag is set to '1', list state node 30 may map to next-state element 34 any symbol that does not match any symbol specified by one of symbol elements 32. In some implementations, the negation flag should be set to the same value for each of symbol elements 32.

The example format presented in Table 1 includes two flags associated with epsilon-transitions. For instance, the epsilon flag indicates that list state node 30 includes an epsilon-transition. If the epsilon flag is set to '1', a thread in pattern matching module 18 may evaluate a node that follows list state node 30 in memory immediately after evaluating list state node 30. In some implementations, the epsilon flag should be set to the same value for each of symbol elements 32.

The epsilon-bar flag instructs pattern matching module 18 to evaluate the next node in memory module 20 only when list state node 30 does not map a current symbol to next-state element 34. For example, if the epsilon bar flag is set to '1', a thread in pattern matching module 18 does not take the epsilon-transition to the next node when the current symbol satisfies the symbol criteria specified in any of symbol elements 32. In some implementations, the epsilon-bar flag should be set to the same value in each of symbol elements 32.

The "last" flag indicates that a symbol element is the last symbol element in list state node 30. If the "last" flag of a symbol element is set to '0', pattern matching module 18 may interpret the 16 bits following the symbol element to be another symbol element. For example, if list state node 30 includes only one symbol element, the "last" flag is set to '1' in the first symbol element.

In the example format presented in Table 1, pattern matching module 18 may interpret the symbol field and the meta-symbol flag together as a 9-bit meta-symbol. In general, if the meta-symbol flag is set to '1', list state node 30 maps to next-state node 34 symbols in a class of symbols described by a meta-symbol. Table 2 presented below indicates an example set of meta-symbols:

TABLE 2

| META-SYMBOL | SYMBOL CLASS | DESCRIPTION |
|---|---|---|
| 0x0FF | Char | Normal symbols to be matched. |
| 0x100 | Epsilon | Explicit ε-transition. No symbol match is performed. A node indicated by the next-state element associated with the symbol element is added to the node vector associated with the current symbol. This explicit ε-transition may only be used in list state nodes that include a single symbol element and a single next-state element. |
| 0x101 | Dot | Matches any symbol |
| 0x102 | Alpha | Matches any alphabetical symbol (i.e., [a-z, A-Z]) |
| 0x103 | Upper | Matches any upper-case alphabetical symbol (i.e., [A-Z]) |
| 0x104 | Lower | Matches any lower-case alphabetical symbol (i.e., [a-z]) |
| 0x105 | Digit | Matches any digit |
| 0x106 | Hexadecimal digit | Matches any hexadecimal digit (i.e., [0-9, a-f, A-F]) |
| 0x107 | Alphanumeric | Matches any alphanumerical symbol (i.e., [0-9, a-z, A-Z]). |
| 0x108 | Whitespace | Matches any whitespace symbol (i.e., [\0x09-\0x0D, \0x20] |
| 0x109 | Not less than/ not greater than | Matches all symbols other than less than or greater than symbol (i.e., c != '>' and c != '<') |
| 0x10A | Range | Matches any symbol when the symbol is greater than or equal to a low value and less than or equal to a high value. |
| 0x10B | Mask | Matches any symbol c when c & MASK == value. |
| 0x10C | Non-match | Never matches. |
| 0x141-0x15A | Case-insensitive | Case-insensitive for A-Z. |

Table 2 presents the numerals associated with the meta-symbols as hexadecimal numbers in which higher-numbered bits are presented to the right of lower-numbered bits. Thus, bit 7 of a symbol element is the leftmost bit as presented in the meta-symbol column and bit 15 of the symbol element is the rightmost bit as presented in the meta-symbol column.

In general, list state nodes are padded to an odd number of symbol elements. Hence, if a list state node includes only an even number of meaningful symbol elements, a symbol element with a non-matchable symbol (i.e., 0x10C) is added to the end of the list state node.

Figure 2B:
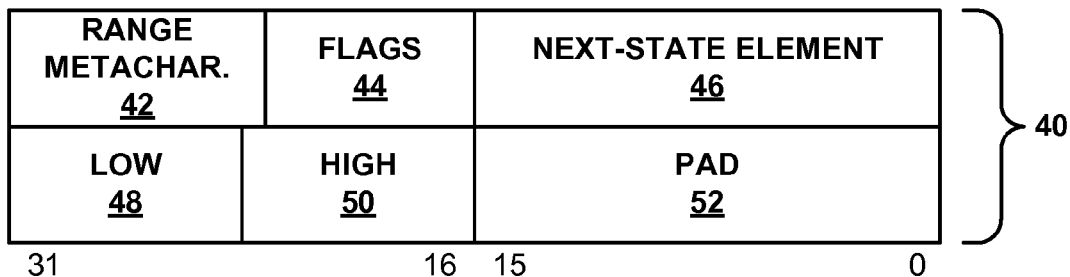
FIG. 2B is a block diagram illustrating an exemplary format of a range state node.

Next-state element 34 may indicate several types of states in an NFA. For instance, next-state element 34 may indicate a non-accepting state of the NFA by specifying a node index of a node that represents state in the NFA. Next-state element 34 may indicate an accepting state in the NFA by specifying a pattern identifier. Next-state element 34 may conform to format outlined in Table 3:

As illustrated in the example of FIG. 2B, range state node 40 also includes a low value 48 at bits 31:24, a high value 50 at bits 23:16, and a pad 52 at bits 15:0. High value 50 represents an upper bound on a range and low value 48 represents a lower bound of the range. Range state node 40 may map to next-state element 48 any symbols that are greater than or equal to low value 48 and less than or equal to high value 50. In this example, pattern matching module 18 does not use pad 52.

Figure 2C:
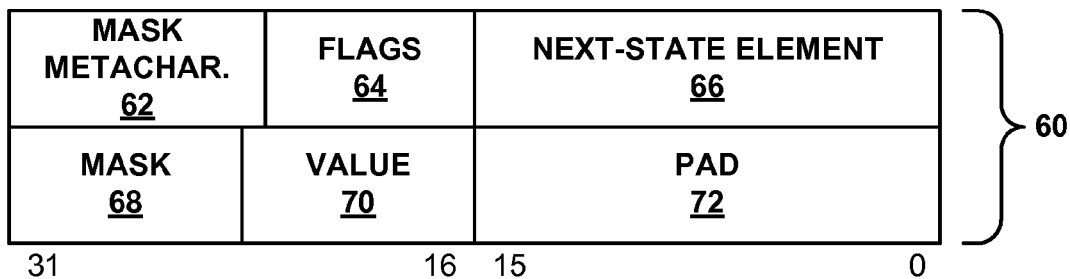
FIG. 2C is a block diagram illustrating an exemplary format of a masked-test state node.

FIG. 2C is a block diagram illustrating an exemplary format of a masked-test state node 60. In the example format illustrated in FIG. 2C, masked-test state node 60 includes a symbol element that includes a mask meta-symbol 62 (i.e., 0x10B) and a set of flags 64. The range meta-symbol 62 and set of flags 64 may conform to the format described in Table 1 and Table 2. Furthermore, in this example format, masked-test state node 60 includes a next-state element 66. Next-state element 66 may conform to the format described in Table 3.

TABLE 3

| BINARY PREFIX | ENCODING | DESCRIPTION |
|---|---|---|
| 0* | Node_Index = Next-state element[14:0] | Bits 14:0 of the next-state element indicate a node index of a state node. |
| 10* | Reserved | Reserved for Unicode processing. |
| 110* | Node_Index = Next-state element[12:0] | Bits 12:0 of the next-state element indicate a node index of a map node. |
| 1110* | Pattern_Identifier = Next-state element[12:0] (Unanchored) | Bits 12:0 of the next-state element indicate a pattern identifier of an unanchored pattern. |
| 1111* | Pattern_Identifier = Next-state element[12:0] (End-anchored) | Bits 12:0 of the next-state element indicate a pattern identifier of an end-anchored pattern. |

FIG. 2B is a block diagram illustrating an exemplary format of a range state node 40. In the example format illustrated in FIG. 2B, range state node 40 includes a symbol element that includes a range meta-symbol 42 (i.e., 0x10A) and a set of flags 44. Range meta-symbol 42 and set of flags 44 may conform to the format described in Table 1 and Table 2. Furthermore, in this example format illustrated in FIG. 2B, range state node 40 includes a next-state element 46. Next-state element 46 may conform to the format described in Table 3.

In this example format, masked-test state node 60 includes a mask 68 at bits 31:24, a value field 70 at bits 23:16, and a pad 72 at bits 15:0. Masked-test state node 60 maps to next-state element 66 any symbol that, when logically ANDed with the value in mask 68, equals the value of value field 70. For example, when a thread in pattern matching module 18 evaluates masked-test state node 60, the thread may perform a bitwise AND operation on the current symbol and mask 68. If the resulting value matches value 70, then pattern matching module 18 may evaluate next-state element 66. In this example, pattern matching module 18 does not use pad 72.

Figure 3:
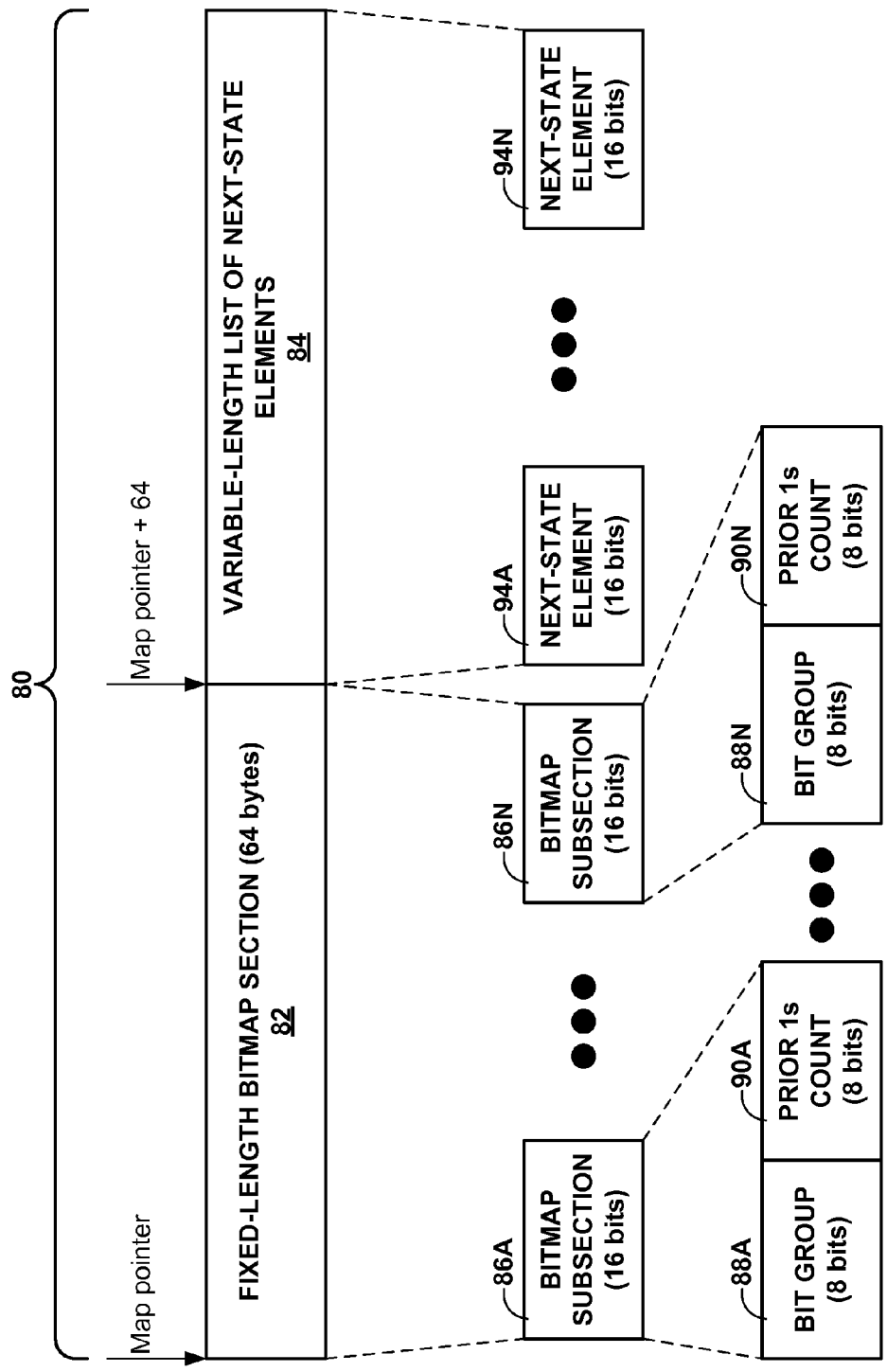
FIG. 3 is a block diagram illustrating an exemplary format for a map node.

FIG. 3 is a block diagram illustrating an exemplary format for a map node 80. Many map nodes do not need to specify a next-state element for each symbol value in a set of symbols. For this reason, map nodes may be formatted using a bitmap encoding scheme that uses run-length compression. As illustrated in the example of FIG. 3, map node 80 includes a variable-length list of one or more next-state elements 84. List of next-state elements 84 includes next-state elements 94A through 94N (collectively, "next-state elements 94"). In addition, map node 80 includes a 64-byte bitmap section 82. Bitmap section 82 provides the run-length encoding information.

Bitmap portion 82 may be divided into 32 bitmap subsections 86A through 86N (collectively, "bitmap subsections 86"). Each of bitmap subsections 86 may be a 16-bit value that consists of a bit group and a prior-1s-count. In the example of FIG. 3, bit groups are labeled 88A through 88N and may be collectively referred to herein as "bit groups 88". Prior-1s-counts are labeled 90A through 90N and may be collectively referred to herein as "prior-1s-counts 90". Each of bit groups 88 may include eight bits and each of prior-1s-counts 90 may include eight bits.

Each of the bits in bit groups 88 may be associated with one of 256 different symbols. In bit groups 88, a bit has the value '1' when the bit is the last bit of a "run" of bits in bit groups 88 that are associated with a common one of next-state elements 94. For example, suppose bit group 88A includes the binary value "0010 0001". In this example, map node 80 maps symbols associated with the first three bits to a first one of next-state elements 94 in list of next-state elements 84 and maps symbols associated with the next five bits to a second one of next-state elements 94 in list of next-state elements 84.

Each of prior-1s-counts 90 indicates the number of bits that are set to '1' in the ones of bit groups 88 that are located to the left of the bitmap subsection of which the prior-1s-count is a part. For example, prior-is-count 90A is always zero because there are no bit groups to the left of bitmap subsection 86A, prior-1s-count 90B indicates the number of bits in bit group 88A that are set to '1', prior-is-count 90C indicates the number of bits in bit groups 88A and 88B that are set to '1', and so on. In another example, if the value of bit group 88A is the binary value "0010 0001", prior-is-count 90A indicates the number '0' and prior-1s-count 90B indicates the number '2' because there are two bits set to '1' in the ones of bit groups 88 that are located in bitmap subsections to the left of bitmap subsection 86B (i.e., bit group 88A).

Using the example format illustrated in FIG. 3, pattern matching module 18 (FIG. 1) may locate one of next-state elements 94 in list of next-state elements 84 for a symbol by performing the following:

(1) retrieve from memory a bitmap subsection by accessing a memory location identified by the memory address of the start of the list of next-state elements plus the value of bits 7:3 of the symbol left-shifted by one position;

(2) formulate a run number by adding a prior-1s-count from the bitmap subsection with count of bits set to '1' in a bit group corresponding to symbols to the left of symbols 2:0 of the symbol; and (3) retrieve from memory module 20 a next-state element by accessing a memory location identified by the value map pointer plus 64 plus the run number multiplied by 2.

Figure 4:
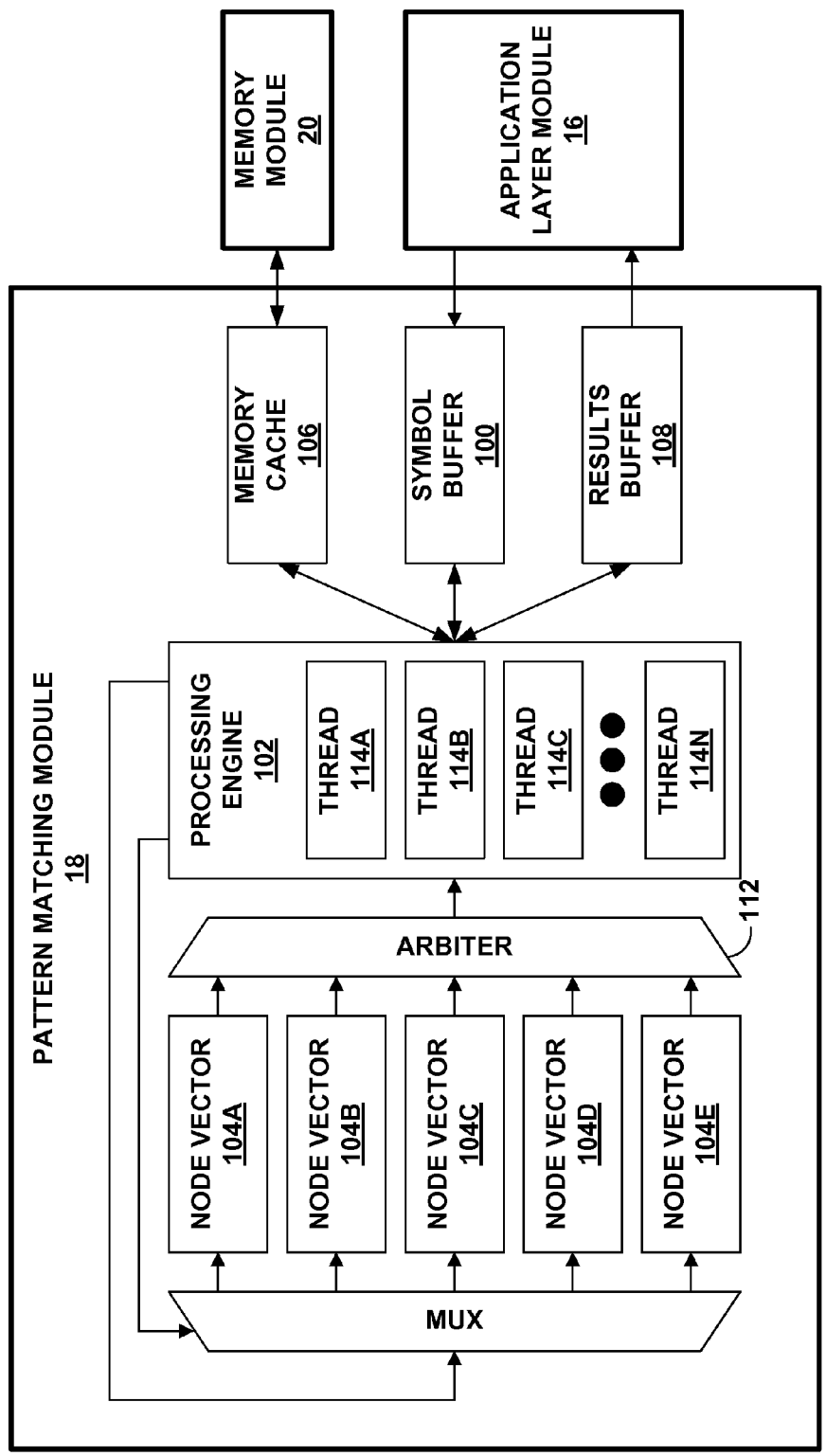
FIG. 4 is a block diagram illustrating exemplary details of a pattern matching module.

FIG. 4 is a block diagram illustrating exemplary details of a hardware-based implementation of pattern matching module 18 within Intrusion Detection and Prevention (IDP) device 4 (FIG. 1). In the example of FIG. 4, pattern matching module 18 includes a symbol buffer 100 that receives symbols in a symbol stream from application-layer module 16 and buffers the symbols. In addition, pattern matching module 18 may include a processing engine 102, a set of node vectors 104A through 104E (collectively, "node vectors 104"), a memory cache 106, a results buffer 108, and an arbiter 112.

Memory cache 106 intercepts read and write requests from processing engine 102 to memory module 20. When memory cache 106 intercepts a read request for data associated with a particular memory address, memory cache 106 may determine whether memory cache 106 includes the data associated with the memory address. If memory cache 106 includes the data associated with the memory address, memory cache 106 may provide the data to processing engine 102. Otherwise, if memory cache 106 does not include the data associated with the memory address, memory cache 106 may forward the read request to memory module 20. When memory module 20 returns the requested data, memory cache 106 may store the data, and forward the data to processing engine 102. When memory cache 106 intercepts a request to write data to a particular memory address, memory cache 106 may store the data, and forward the write request to memory module 20.

Each of node vectors 104 may represent a high-speed memory, such as a queue or register bank, having storage elements that may each specify with one or more nodes of NFA representation 23 (FIG. 1). For example, each element of each of node vectors 104 may store data for a corresponding node. In one example, each element of each of node vectors 104 may store a node index that indicates a node. In another example, each element of each node vectors 104 may store an entire node.

Each of node vectors 104 may store a limited number of node indexes. For instance, node vectors 104 may store up to eight or sixteen node indexes. However, there may be circumstances in which one of node vectors 104 needs to store more node indexes than the node vector is capable of storing. In these circumstances, pattern matching module 18 may store the excess node indexes in memory module 20.

The elements of node vectors 104 may store status data to designate the respective node as "evaluated," "currently being evaluated," or "unevaluated." A designation of a node as being "evaluated" means that processing engine 102 has already evaluated the node. A designation of a node as being "currently being evaluated" means that processing engine 102 is current evaluating the node. A designation of a node index as being "unevaluated" means that processing engine 102 has not yet evaluated the node.

In general, arbiter 112 manages node vectors 104. Arbiter 112 may temporarily associate each one of node vectors 104 with a single symbol index. As used in this disclosure, a "symbol index" is a value that represents the position in the symbol stream (i.e., a symbol position). For example, the symbol index '0' represents the first symbol position in the symbol stream, the symbol index '1' represents the second symbol position in the symbol stream, and so on. Thus, each of node vectors 104 is associated with one symbol position in the symbol stream.

Arbiter 112 may permanently associate each of node vectors 104 with a "vector index." A "vector index" is a number associated with one of node vectors 104. For example, arbiter 112 may associate node vector 104A with a node vector of "0", node vector 104B with a node vector of "1", node vector 104C with a node vector of "2", node vector 104D with a node vector of "3", node vector 104E with a node vector of "4". The symbol index modulo 5 is equal to the vector index of the node vector associated with the symbol index. For example, suppose that arbiter 112 associates node vector 104B with vector index 1. In this example, node vector 104B may be associated with symbol index 6 because 6 mod 5=1. Because of this relationship, it is possible to determine which of node vectors 104 is associated with any symbol index.

Arbiter 112 may set a "symbol window index" variable to "0". The "symbol window index" variable denotes the lowest symbol index for which there is an unevaluated state in one of node vectors 104. When the one of node vectors 104 associated with the "symbol window index" variable contains only evaluated node indexes, arbiter 112 may clear the node indexes in the one of node vectors 104 associated with the "symbol window index" variable. Arbiter 112 may then increment the value of the "symbol window index" variable. In this way, the one of node vectors 104 that was previously associated with the "symbol window index" may become the node vector that follows the node vector associated with the last symbol in the symbol window. Furthermore, arbiter 112 may cause the one of node vectors 104 that was previously associated with the "symbol window index" to specify nodes that represent unanchored states of the NFA. Unanchored states may represent initial states of threat signatures that may begin at any symbol in the symbol stream.

Processing engine 102 may include a plurality of parallel processing hardware components referred to as threads 114A through 114N (collectively, "threads 114"). Each of threads 114 may be implemented in hardware and operate in parallel with one another. When one of threads 114 is idle, the thread may provide an event to arbiter 112 that alerts arbiter 112 that the thread is idle. In response to this event, arbiter 112 accesses node vectors 104 to select any unevaluated node specified by the ones of node vectors 104 associated with symbol positions in the symbol window.

In selecting an unevaluated node, arbiter 112 may prioritize nodes specified by node vectors associated with lower symbol indexes. For example, suppose that node vector 104A is associated with the "symbol window index" variable. In this example, arbiter 112 may determine whether node vector 104A specifies any unevaluated nodes. If node vector 104A specifies one or more unevaluated nodes, arbiter 112 selects one of these unevaluated nodes. Otherwise, if node vector 104A does not specify any unevaluated nodes, arbiter 112 may determine whether the one of node vectors 104 associated with the symbol index of "symbol window index" plus 1 (e.g., node vector 104B) specifies any unevaluated nodes. If node vector 104B specifies one or more unevaluated node indexes, arbiter 112 may select one of these unevaluated node indexes. Otherwise, if node vector 104B does not specify with any unevaluated node indexes, arbiter 112 determines whether the one of node vectors 104 associated with the symbol index of "symbol window index" plus 2 (e.g., node vector 104C) specifies any unevaluated nodes. If node vector 104C specifies one or more unevaluated node indexes, arbiter 112 may select one of these unevaluated nodes indexes. Otherwise, if node vector 104C does not specify any unevaluated node indexes, arbiter 112 may determine whether the one of node vectors 104 associated with the symbol index of "symbol window index" plus 3 (e.g., node vector 104D) specifies any unevaluated nodes. If node vector 104D specifies one or more unevaluated node indexes, arbiter 112 may select one of these unevaluated node indexes. Otherwise, if node vector 104D does not specify any unevaluated node indexes, arbiter 112 may again determine whether node vector 104A specifies any unevaluated nodes. Despite the fact that node vector 104A did not initial specify any unevaluated nodes, node vector 104A may now contain an unevaluated node because a node specified by node vector 104A that was being evaluated may have added a new node to node vector 104A. Arbiter 112 may continue in this fashion until arbiter 112 identifies an unevaluated node.

After selecting an unevaluated node, arbiter 112 may designate the unevaluated node as "currently being evaluated." Arbiter 112 may then assign the selected node to an idle one of threads 114. In order to assign a node specified by one of node vectors 104 to one of threads 114, arbiter 112 may provide a node index of this node and a symbol index associated with this node vector to this thread. The symbol position identified by the symbol index may be referred to herein as the "current symbol position."

After arbiter 112 provides a node index and a symbol index to one of threads 114, the thread may evaluate the node specified by the node index with respect to the symbol indicated by the symbol index. For example, the thread may use the symbol index to retrieve a symbol from symbol buffer 100. This symbol may be referred to herein as the "current symbol." In addition, the thread may retrieve from memory module 20 (or memory cache 106) a node identified by the node index. This node may be referred to herein as the "current node."

After retrieving the current symbol and the current node, the thread may determine whether the current node is a state node or a map node. If the current node is a map node, the thread may calculate a memory address of a next-state element in the map node associated with to the current symbol. For example, the thread may use the process outlined above in respect to FIG. 3 to calculate the memory address of the next-state element in memory module 20. After calculating the memory address of the next-state element that corresponds to the current symbol, the thread may send a read request to memory module 20 for the content of the memory location associated with the calculated memory address. If memory cache 106 includes the content of the memory location associated with the calculated memory address, memory cache 106 may respond to the read request on behalf of memory module 20. After retrieving the next-state element, the thread may process the next-state element as described below.

If the current node is a state node, the thread may determine whether the current node maps the current symbol to the next-state element of the current node. In order to determine whether the current node maps the current symbol to the next-state element, the thread may examine each of the symbol elements of the state node and determine whether the symbol conforms to the symbol criteria specified by any of the symbol elements. For example, if a meta-symbol flag of a symbol element is set to '0', the thread determines whether the current symbol matches a symbol specified in the symbol element. If the current symbol matches the symbol specified in the symbol element, the current node does map the current symbol to the next-state element of the current state. On the other hand, if the meta-symbol flag of a symbol element is set to '1', the thread may determine whether the current symbol is a member of a class of symbols described by a meta-symbol. For instance, if the symbol value specified in the symbol element is "0x02", the thread may determine that the current node maps the current symbol to the next-state element if the current symbol is an alphabetical symbol. When the symbol value specified in the symbol element is "0x00" (i.e., an explicit epsilon-transition), the thread may cause a one of node vectors 104 associated with a current symbol position to specify a node indicated by the next-state element. The thread does not determine that the current node maps the current symbol to the next-state element.

After determining whether the current node maps the current symbol to the next-state element, the thread may determine whether the epsilon flag of the symbol elements has been set to '1'. If the epsilon flag of the symbol elements has been set to '1' and the current node maps the current symbol to the next-state element, the thread may process the next-state element of the state node as described below.

Regardless of whether the current node maps the current symbol to the next-state element, if the epsilon flag of the symbol elements is set to '1', the thread may determine whether the epsilon-bar flag of the symbol elements is set to '1'. If the epsilon-bar flag of the symbol elements is set to '0' or the current node does not map the current symbol to the next-state element, the thread may send a read request for the node in memory module 20 that follows the current node. The node that follows the current node may be a state node or a map node that includes one or more epsilon transitions and may map one or more symbols to one or more next-state elements. After receiving the node that follows the current node, the thread may evaluate this node like any other node. On the other hand, if the epsilon-bar flag of the symbol elements is set to '1' and the current node maps the current symbol to the next-state element, the thread "retires" and notifies arbiter 112 that the thread is idle.

If the epsilon flags of the symbol elements are not set to '1' and if the current node maps the current symbol to the next-state element, the thread may determine whether the node in memory module 20 that follows the current node is the node indicated by the next-state element of the current node. If the node in memory module 20 that follows the current node is the node indicated by the next-state element of the current node, the node indicated by the next-state element becomes the new "current node." In addition, the thread may increment the value of symbol index. The thread may then loop back and evaluate this new current state with the new current symbol. On the other hand, if the epsilon flags of the symbol elements are not set to '1', the current node maps the current symbol to the next-state element, and the node in memory module 20 that follows the current node is not the node indicated by the next-state element of the state node, the thread may process the next-state element of the current node and retire.

If the epsilon flags of the symbol elements are not set to '1' and if the current node does not map the current symbol to the next-state element, the thread may "retire" and notify arbiter 112 that the thread is idle.

To process a next-state element, the thread may first determine whether bit 15 of the next-state element is 0. If bit 15 of the next-state element is 0, the thread may determine whether the value of bits 14:0 equals 0x7FFF (i.e., the dead state). Bits 14:0 of the next-state element may represent a node index. If the value of the node index does not equal 0x7FFF, the thread may determine whether the one of node vectors 104 associated with the symbol position that follows the current symbol position already specifies a node indicated by the node index. In this example, if the node vector already specifies this node, the thread does not add the node index to the node vector. On the other hand, if the node vector does not specify this node, the thread may cause this node vector to specify this node. In one example, the thread may store the node index in the one of node vectors 104 that is associated with a vector index equal to the symbol index of the current symbol plus 1, modulo 5. If the value of the node index is 0x7FFF, no further action is required because the next-state element indicates the dead state.

If the value of bit 15 of the next-state element is '1', the thread may determine whether the value of bit 14 is '1' and whether the value of bit 13 is '0'. If the value of bit 14 is '1' and the value of bit 13 is '0', bits 12:0 of the next-state element may indicate a map node index. In this situation, the thread may cause a map node indicated by this map node index to be specified by the one of node vectors 104 associated with a symbol position that follows the current symbol position.

If the value of bit 15 of the next-state element is '1', the value of bit 14 is '1', the value of bit 13 is '1', and the value of bit 12 is '0', the value of bits 12:0 may represent a pattern identifier. In this case, the thread may add the pattern identifier to results buffer 108. In addition, the thread may add the current symbol index to results buffer 108 in order to indicate a position of the threat signature within the symbol stream.

If the value of bit 15 of the next-state element is '1', the value of bit 14 is '1', the value of bit 13 is '1', and the value of bit 12 is '1', the value of bits 12:0 may represent a pattern identifier for an end-anchored pattern. In this case, the thread may determine whether the current symbol is an "end of text" symbol and determine whether the current symbol is the last symbol in the symbol stream. If the current symbol is an "end of text" symbol and the current symbol is the last symbol in the symbol stream, the thread may add the pattern identifier of bits 12:0 and the symbol index to results buffer 108.

Figure 5:
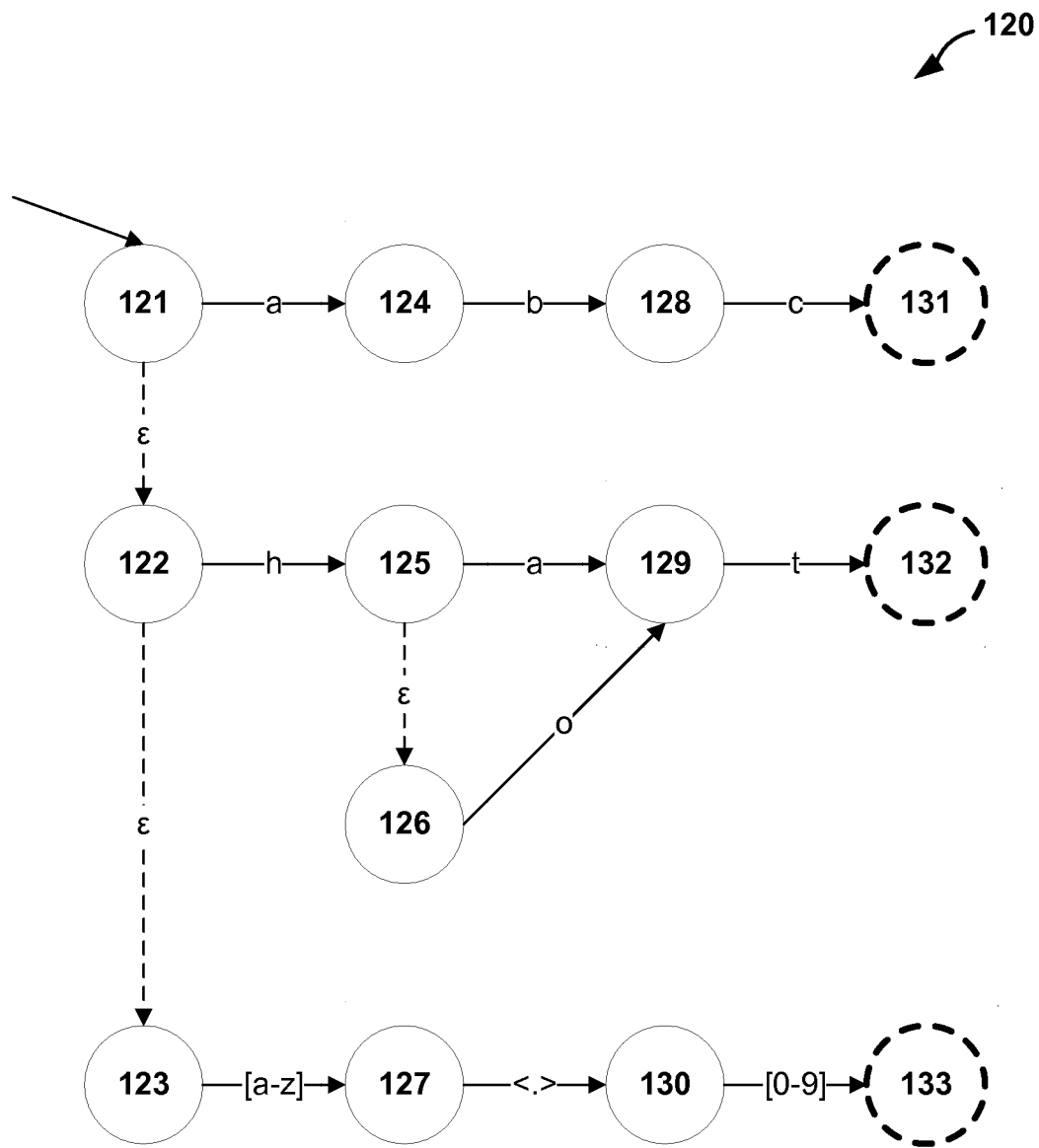
FIG. 5 is a block diagram illustrating an exemplary representation of a non-deterministic finite automaton.

FIG. 5 is a block diagram illustrating an exemplary representation of a non-deterministic finite automaton 120. In the example of FIG. 5, nodes of NFA 120 are represented as circles, symbol transitions are represented as solid arrows, and epsilon-transitions are represented as dashed arrows. Furthermore, accepting states are represented as dashed circles. Each accepting state may be associated with a pattern identifier. NFA 120 accepts symbol streams that conform to the pattern described by the regular expression "abc h[ao]t|[a-z][0-9]"

Initially, arbiter 112 may associate node vector 104A with the first symbol position in a symbol stream, node vector 104B with the second symbol position in the symbol stream, node vector 104C with the third symbol position in the symbol stream, node vector 104D with the fourth symbol position in the symbol stream, and node vector 104E with the fifth symbol position in the symbol stream. Arbiter 112 may then add a node index of node 121 to node vector 104A. After adding the node index of node 121 to node vector 104A, arbiter 112 may assign node 121 to a first one of threads 114.

When the first one of threads 114 evaluates state 121, the first one of threads 114 may determine whether the symbol in symbol buffer 100 at symbol index 0 is the symbol 'a'. If so, the first one of threads 114 may add a node index of node 124 to node vector 104B. The first one of threads 114 may add the node index of node 124 to node vector 104B because node vector 104B is currently associated with a second symbol position of the symbol stream. In addition, the first one of threads 114 may evaluate node 122 because there is an epsilon-transition from node 121 to node 122. When the first one of threads 114 evaluates node 122, the first one of threads 114 may determine whether the symbol at symbol index 0 is the symbol 'h'. If so, the first one of threads 114 may add a node index of node 125 to node vector 104B. In addition, the first one of threads 114 may evaluate node 123 because there is an epsilon-transition from node 122 to node 123. When the first one of threads 114 evaluates node 123, the first one of threads 114 may determine whether the symbol at symbol index 0 is a lower-case alphabetical symbol. If so, the first one of threads 114 may add a node index of node 127 to node vector 104B. Because there are no epsilon-transitions from state 123, the first one of threads 114 may retire after evaluating state 123. The first one of threads 114 evaluates nodes 121, 122, and 123 because nodes 121, 122, and 123 are connected through epsilon transitions. Because nodes 121, 122, and 123 are connected through epsilon transitions, nodes 122 and 123 are always going to be evaluated when node 121 is evaluated. Therefore, time may be saved by not adding nodes 122 and 123 to node vector 104A. Furthermore, because nodes 121, 122, and 123 are connected through epsilon transitions, nodes 121, 122, and 123 are stored in sequential memory locations in memory module 20 and, consequently may be retrieved in a single memory request. Furthermore, if node 121 is evaluated, nodes 122 and 123 are always going to be evaluated. While first one of threads 114 is performing these actions, arbiter 112 may assign other unevaluated nodes specified by node vectors 104 to other ones of threads 114.

If the symbol at symbol index 0 is the symbol 'a', arbiter 112 may assign node 124 to one of threads 114 as soon as node 124 is added to node vector 104B. This thread may determine whether the symbol at symbol index 1 is the symbol 'b'. If so, the thread may determine whether symbol index 1 is within the symbol window. If symbol index 1 is within the symbol window, the thread may determine whether the symbol at symbol index 2 is the symbol 'c.' If the symbol at symbol index 2 is 'c', the thread may add the pattern identifier associated with node 131 and the symbol index '2' to results buffer 108. If symbol index 1 is not within the symbol window, the thread may add node 124 to node vector 104B and retire.

Alternatively, if the symbol at symbol index 0 is the symbol 'h', node vector 104B includes the node index of node 125. In this situation, arbiter 112 may assign node 125 to a thread in processing engine 102 as soon as node 125 is added to node vector 104B. This thread may determine whether the symbol at symbol position 1 is the symbol 'a.' If the symbol at symbol position 1 is the symbol 'a' and the node index of node 129 is not already in node vector 104C, the thread may add the node index of state 129 to node vector 104C. In addition, the thread may perform the epsilon-transition to state 126. When the thread evaluates node 126, the thread may determine whether the symbol at symbol position 1 is the symbol 'o'. If the symbol at symbol position 1 is the symbol 'o' and the node index of node 129 is not already in node vector 104C, the thread may add the node index of node 129 to node vector 104C. Because there are no further epsilon-transitions from node 126, the thread may retire after evaluating node 126.

If node vector 104C contains node 129, arbiter 112 may assign node 129 to a thread in processing engine 102. This thread may determine whether the symbol at symbol index 2 is the symbol 't'. If the symbol at symbol index 2 is the symbol 't', the thread may add the pattern identifier associated with node 132 and the symbol index 2 to results buffer 108. Because there are no further transitions from node 129, the thread may retire after adding the pattern identifier and the symbol index to results buffer 108.

If node vector 104B contains the node index of node 127, arbiter 112 may assign node 127 to one of threads 114. This thread may then determine that the symbol at symbol index 1 matches the <.> symbol because the <.> symbol matches all symbols. Next, this thread may determine whether symbol index 1 is within the symbol window. If symbol index 1 is not within the symbol window, the thread may add the node index of node 130 to node vector 104C and retire. If symbol index 1 is within the symbol window, this thread may determine whether the symbol at symbol index 2 is a symbol between 0 and 9. If the symbol at symbol index 2 is a symbol between 0 and 9, the thread may add the pattern identifier associated with node 133 and symbol index 2 to results buffer 108.

Figure 6:
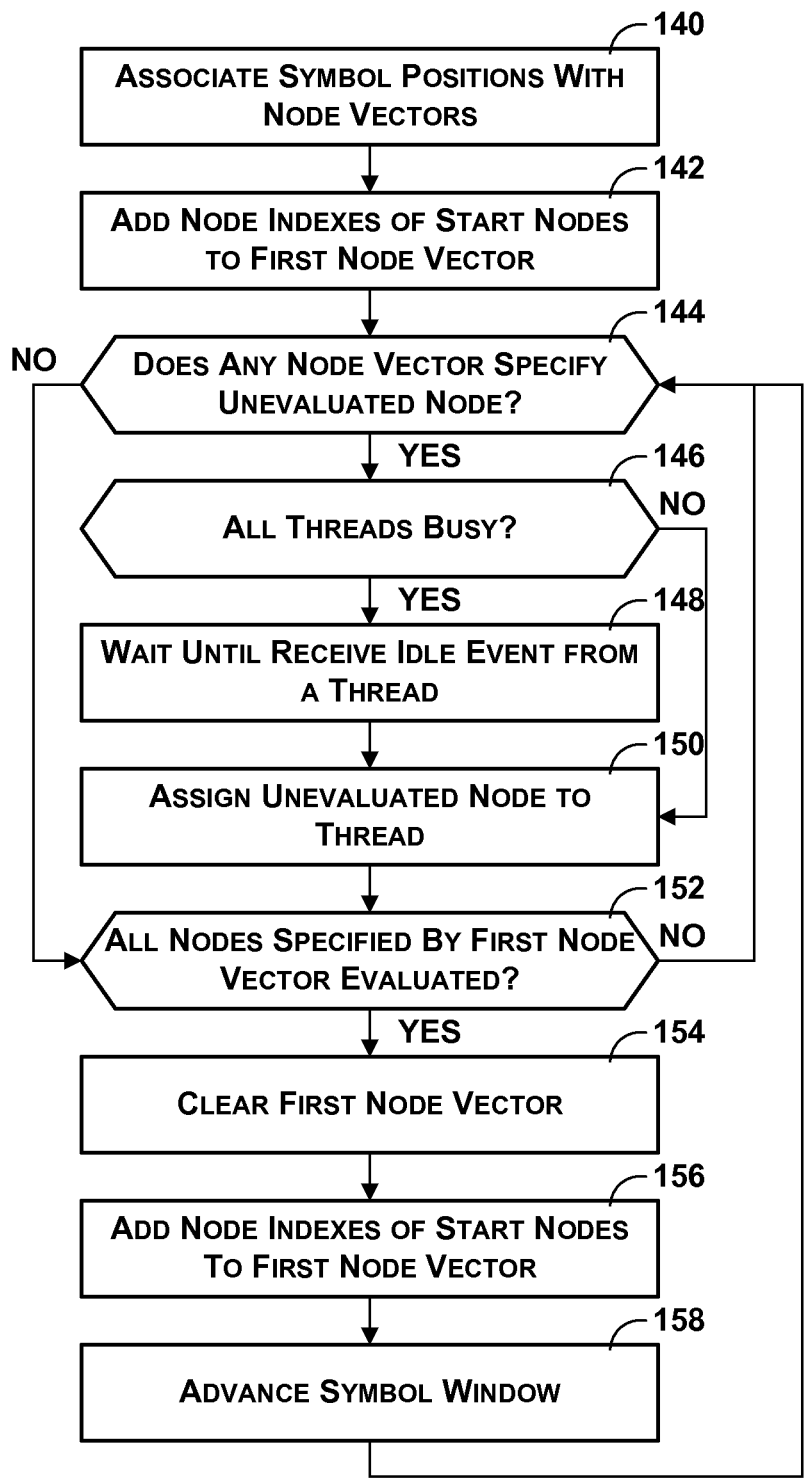
FIG. 6 is a flowchart that illustrates an exemplary operation of an arbiter in the pattern matching module.

FIG. 6 is a flowchart that illustrates an exemplary operation of arbiter 112 in pattern matching module 18. Initially, arbiter 112 may associate each one of node vectors 104 with a different symbol position in a symbol window (140). For example, arbiter 112 may associate node vector 104A with the first symbol position of a symbol stream, node vector 104B with the second symbol position of the symbol stream, and so on. Next, arbiter 112 may add to node vector 104A node indexes that indicate nodes that represent start states of a NFA (142). In the example of FIG. 6, node vector 104A is referred to as the first node vector because arbiter 112 associated node vector 104A with the first symbol position in the symbol window.

After adding the node indexes to the first node vector, arbiter 112 may determine whether any of node vectors 104 specify an unevaluated node (144). If arbiter 112 determines that one of node vectors 104 specifies an unevaluated node ("YES" of 144), arbiter 112 may determine whether all of threads 114 are busy (146). If all of the threads are busy ("YES" of 146"), arbiter 112 may wait until one of threads 114 provides an event to arbiter 112 notifying arbiter 112 that the thread is idle (148). When arbiter 112 receives such an event, arbiter 112 may assign the unevaluated node to the idle thread (150). On the other hand of arbiter 112 determines that one of the threads is not busy ("NO" of 146), arbiter 112 may immediately assign the unevaluated node to the idle thread (150).

After arbiter 112 assigns the unevaluated node to the idle thread, or after arbiter 112 determines that none of node vectors 104 includes an unevaluated node ("NO" of 144), arbiter 112 may determine whether all of the nodes specified by the first node vector have been evaluated (152). If not all of the nodes specified by the first node vector have been evaluated ("NO" of 152), arbiter 112 may loop back and again determine whether the first node vector specifies any unevaluated nodes (144). In other words, arbiter 112 may loop back when the first node vector specifies one or more node that are unevaluated or currently being evaluated.

If all of the nodes specified by the first node vector has been evaluated ("YES" of 152), arbiter 112 may clear the nodes indexes stored in the first node vector (154). After clearing the node indexes stored in the first node vector, arbiter 112 may advance the symbol window (156). When arbiter 112 advances the symbol window, the first node vector becomes the node vector that is associated with the symbol position that follows the last symbol position of the symbol window. After advancing the symbol window, arbiter 112 may insert node indexes of nodes that represent unanchored states of the NFA into the first node vector (158). Arbiter 112 inserts these node indexes into the first node vector because some threat signatures may begin at any point within a symbol stream.

Figure 7:
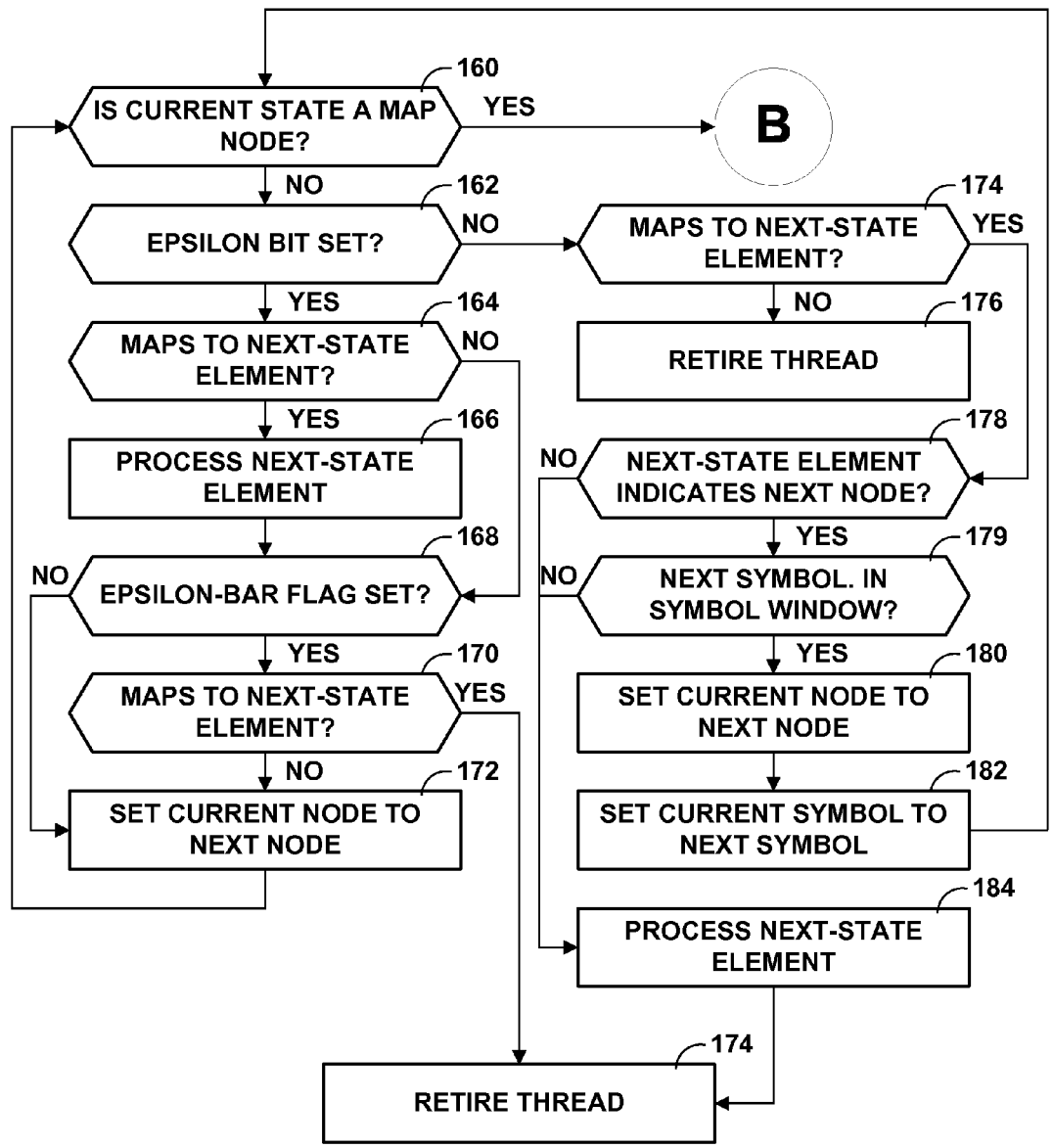
FIG. 7 is a flowchart that illustrates an exemplary operation of a thread in a processing engine to evaluate a state node.

FIG. 7 is a flowchart that illustrates an exemplary operation of one of threads 114 in processing engine 102 to evaluate a state node. Initially, the thread determines whether the current node is a map node or a state node (160). If the current node is a map node ("YES" of 160), the thread may perform an operation illustrated in the example of FIG. 8.

On the other hand, if the current node is not a map node ("NO" of 160), then the current node is a state node. When the thread determines that the current node is a state node, the thread may determine whether the epsilon flag of the current node is set to '1' (162). If the epsilon flag of the current node is set to '1' ("YES" of 162), the thread may determine whether the current node maps the current symbol to the next-state element of the current node (164). If the current node maps the current symbol to the next-state element ("YES" of 164), the thread may evaluate the next-state element of the current node (166). For example, the thread may evaluate the next-state element according to the operation described in the example of FIG. 9.

After processing the next-state element, the thread may determine whether the epsilon-bar flag of the current state has been set to '1' (168). In addition, if the current node does not map the current symbol to the next-state element ("NO" of 164), the thread may determine whether the epsilon-bar flag of the current node has been set to '1' (168). If the epsilon-bar flag of the current node is set to '1' ("YES" of 168), the thread may determine whether the current node maps the current symbol to the next-state element (170). If the current node maps the current symbol to the next-state element ("YES" of 170), the thread retires (174). On the other hand, if the current node does not map the current symbol to the next-state element ("NO" of 170), the thread may request a next node from memory module 20 (172). The next node is the node that follows the current node in memory module 20. The thread may then designate this "next node" as the new current node. After requesting the next state from memory, the thread may loop back and determine whether the current node is a state node or a map node (160).

If the epsilon-bar flag of the current node is not set to '1' ("NO" of 168), the thread may retrieve from memory module 20 the next node (172). The thread may then designate this next node as the new "current node". The thread may then loop back and determine whether the new current node is a state node or a map node (160).

If the epsilon flag of the current state is not set to '1' ("NO" of 162), the thread may determine whether the current node maps the current symbol to the next-state element (174). If the thread determines that the current node does not map the current symbol to the next-state element ("NO" of 174), there is no more work for this thread to do. For this reason, the thread may complete its operation and retire (176).

If the thread determines that the current node maps the current symbol to the next-state element ("YES" of 174), the thread may determine whether a node indicated by the next-state element of the current node is the same as the node in memory module 20 that follows the current node (178). If the node indicated by the next-state element of the current node is the same as the node in memory module 20 that follows the current node ("YES" of 178), the thread may determine whether the next symbol in stream buffer 100 is in the symbol window (179). If the next symbol in stream buffer 100 is in the symbol window ("YES" of 179), then the thread may designate the node in memory module 20 that follows the current node as the "current node" (180). Next, the thread may set the current symbol to the next symbol in stream buffer 100 (182). In other words, the thread may designate the symbol that follows the current symbol as the "current symbol". The thread may then loop back, retrieve the symbol in symbol buffer 100 at the symbol index, and determine whether the new current node is a map node or a state node (160). In this way, the thread may quickly evaluate a series of sequential symbols.

Otherwise, if the node indicated by the next-state element of the current node is not the same as the node in memory module 20 that follows the current node ("NO" of 178) or if the next symbol in stream buffer 100 is not in the symbol window ("NO" of 179), the thread may process the next-state element of the current node (184). For example, the thread may process the next-state element of the current node using the operation outlined in the example of FIG. 9. After processing the next-state element of the current node, the thread may retire (174).

Figure 8:
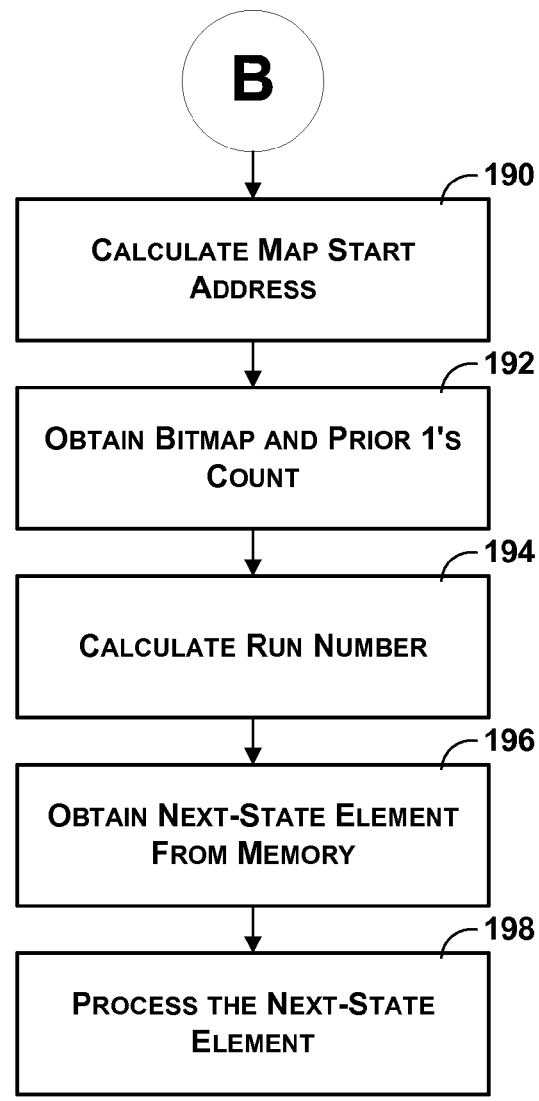
FIG. 8 is a flowchart that illustrates an example operation to evaluate a map node.

FIG. 8 is a flowchart that illustrates an example operation to evaluate a map node. In the example illustrated in FIG. 8, one of threads 114 may begin to evaluate a map node by calculating a map start address (190). The thread may calculate the map start address by left-shifting a MAP_BASE address by seven positions, left-shifting a map index of the map node by four positions, and adding the two shifted values together.

After calculating the map start address, the thread may obtain a bit group and a prior-1s-count from memory module 20 or cache 106 (192). For example, the thread may obtain the bit group and the prior-1s-count by extracting bits 7:3 of a current symbol and left shifting the extracted bits by one position. The thread may then calculate a memory address by adding this shifted value to the map start address. After calculating this memory address, the thread may retrieve a 16-bit block from the location in memory associated with this calculated memory address. The first eight bits of this block may represent the bit group and the second eight bits of this block represent the prior-1s-count.

When the thread has obtained the bit group and the prior-1s-count, the thread may calculate a run number (194). The run number represents the number of 1's to the left of the bit associated with the current symbol. In order to calculate the run number, the thread may calculate the number of bits in the bit group set to '1' that are to the left of the bit associated with the current symbol. After calculating the number of bits in the bit group set to '1' that are to the left of the bit associated with the current symbol, the thread may calculate the run number by adding the number of bits in the bit group set to '1' that are to the left of the bit associated with the current symbol to the prior-1s-count.

Next, the thread may obtain a next-state element in the current node from memory module 20 (196). In order to obtain the next-state element, the thread may calculate a memory address of the next-state element. For example, the thread may calculate a memory address of the next-state element by adding the map start address, the number sixty-four, and the run number multiplied by two. The thread may then use this memory address to obtain the next-state element from memory module 20 (or memory cache 106).

After the thread obtains the next-state element from memory module 20 or memory cache 106, the thread may process the next-state element (198). For example, the thread may process the next-state element by performing the operation described in the example of FIG. 9.

Figure 9:
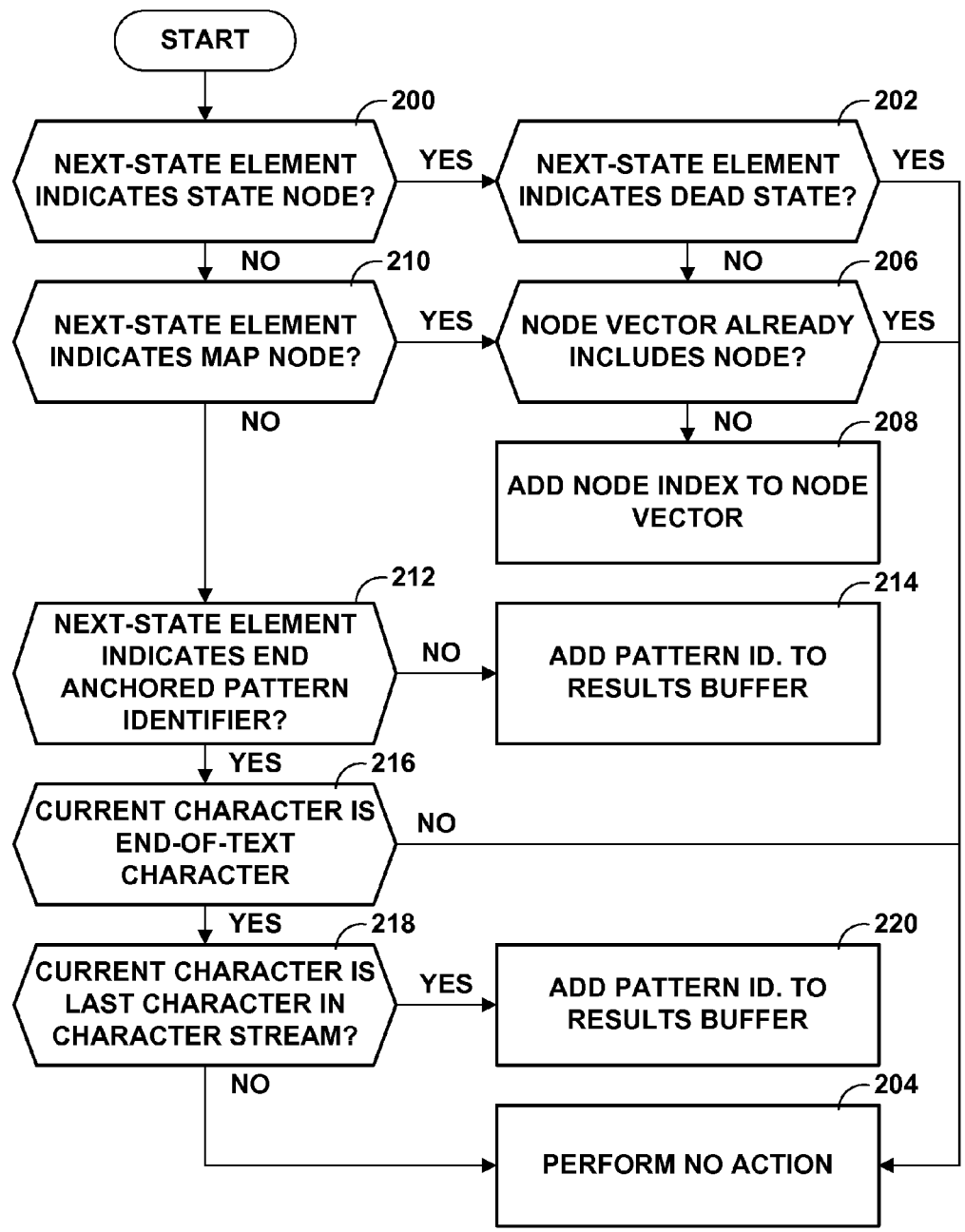
FIG. 9 is a flowchart that illustrates an example operation to process a next-state element.

FIG. 9 is a flowchart that illustrates an example operation to process a next-state element. In this example operation, one of threads 114 may determine that a next-state element specifies a state node index (200). If the next-state element specifies a state node index ("YES" of 200), the thread may determine whether the next-state element specifies the node index 0x7FFF (i.e., the dead state) (202). In this example operation, if the next-state element specifies the node index 0x7FFF ("YES" of 202), the thread performs no action (204). On the other hand, if the next-state element specifies a node index other than 0x7FFF ("NO" of 202), the thread may determine whether the one of node vectors 104 associated with vector index ((N+1) mod 5) includes the state node index, where N is the current symbol index (206). If this node vector already includes the state node index ("YES" of 206), the thread performs no action (204). Otherwise, if the node vector does not already include the state node index ("NO" of 206), the thread may add the state node index to this node vector (208).

If the next-state element does not specify a state node index ("NO" of 200), the thread may determine whether the next-state element specifies a map node index (210). If the next-state element specifies a map node index ("YES" of 210), the thread may determine whether the one of node vectors 104 associated with vector index ((N+1) mod 5) includes the state node index (206). If this node vector already includes the state node index ("YES" of 206), the thread performs no action (204). Otherwise, if the node vector does not already include the state node index ("NO" of 206), the thread may add the state node index to this node vector (208).

On the other hand, if the next-state element does not specify a map node index ("NO" of 210), the thread may determine whether the next-state element specifies a pattern identifier for a pattern that is not end-anchored (212). If the next-state element specifies a pattern identifier that is not end-anchored ("NO" of 212), the thread may add the pattern identifier specified in the next-state element and the current symbol index to results buffer 108 (214).

If the next-state element specifies a pattern identifier that is end-anchored ("YES" of 212), the thread may determine whether the current symbol is an end-of-text symbol (216). If the thread determines that the current symbol is an end-of-text symbol ("YES" of 216), the thread may determine whether the current symbol is the last symbol of the symbol stream (218). If the current symbol is the last symbol of the symbol stream ("YES" of 218), the thread may add the pattern identifier in the next-state element and the current symbol index to results buffer 108 (220). Otherwise, if the current symbol is not an end-of-text symbol ("NO" of 216) or if the current symbol is not the last symbol in the symbol stream ("NO" of 218), the thread performs no action (204).

Figure 10:
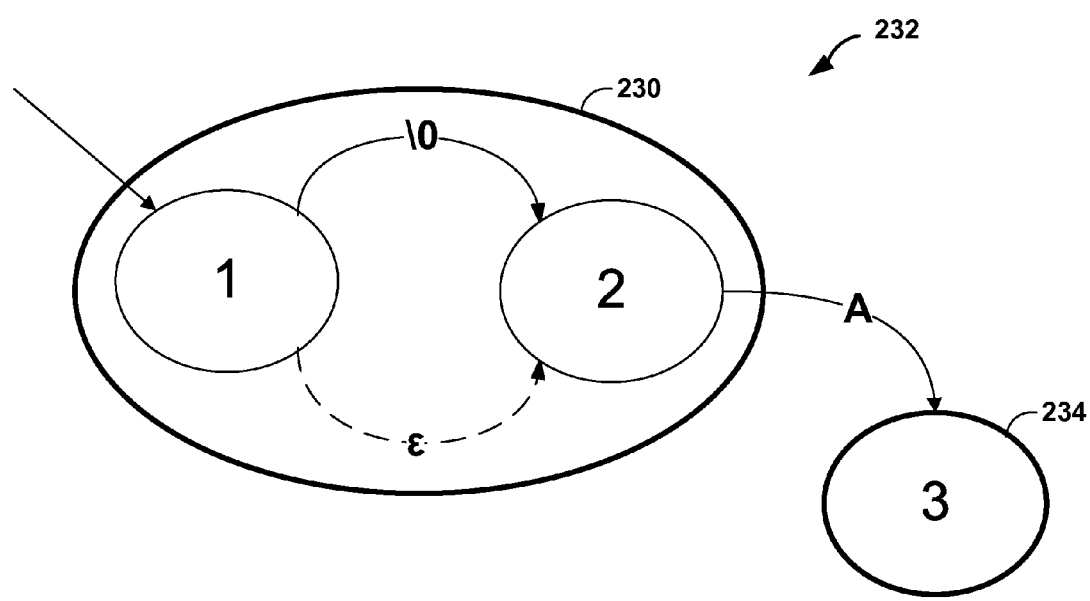
FIG. 10 is a block diagram illustrating an exemplary node in which the pattern matching module evaluates a Unicode symbol.

FIG. 10 is a block diagram illustrating an exemplary node 230 in which pattern matching module 18 evaluates a Unicode symbol. As described above, bits 15:8 of a symbol element in a state node may specify a symbol value. However, the Unicode standard provides at least two ways of representing a single standard ASCII symbol. In particular, the Unicode standard provides that a standard ASCII symbol may be represented in a single 8-bit block. In addition, the Unicode standard provides that the same ASCII symbol may be represented in two 8-bit blocks, wherein the first of the 8-bit blocks is all zeros and the second of the 8-bit blocks is the same as the single 8-bit block representation. For example, under the Unicode standard, the letter 'A' may be represented by the bits '0100 0001' or by the bits '0000 0000 0100 0001'.

The example of FIG. 10 provides details of a finite automaton node 232 in which the Unicode flag has been set to '1' When pattern matching module 18 starts processing state node 230, pattern matching module 18 may transition into a first sub-state. Pattern matching module 18 may transition from the first sub-state to a second sub-state when the current symbol is all zeros. In this way, pattern matching module 18 'consumes' the current symbol and makes the symbol in the symbol stream that follows the current symbol into the new current symbol. In addition, pattern matching module 18 may transition to the second sub-state through an epsilon-transition. Pattern matching module 18 may then determine whether the "current symbol" matches one of the symbols in the symbol elements of state node 230. If the "current symbol" matches one of the symbols in the symbol elements of state node 230, pattern matching module 18 may transition from the second sub-state to node 234, as indicated by the next-state element associated with the symbol element that specifies the matching symbol. In this way, pattern matching module 18 may transition from state node 230 to node 234 when either the current symbol matches one of the symbols in the symbol element of state node 230 or when the current symbol is all zeros and the next symbol matches one of the symbols in the symbol elements of state node 230.

The functions described in this disclosure may be applied to any of a variety of data stored and/or retrieved using data storage media or communicated, e.g., transmitted and/or received, via a wired or wireless communication system. Examples of wired and wireless communication systems include any communication techniques including without limitation wireless transmission using CDMA, GSM, 802.11, Bluetooth, ultra wide band (UWB), OFDM, FDMA, TDMA, W-CDMA, or any other radio access techniques or technologies, and wired or wireless transmission using any of a variety of network protocols such as TCP/IP, ATM, or the like. The functions may be applied to any type of data including but not limited to music data, video data, multimedia data, or other entertainment data, financial data, security data, business data, government data, military data, marketing data, sales data, medical patient data, medical diagnostic data, medical imaging data, data representing graphical or textual content, image data, chemical data, geographic data, mapping data, television broadcast data, radio broadcast data, email data, Internet data, personal data, or the like.

In one or more exemplary embodiments, the functions described may be implemented in hardware, software, and/or firmware, or any combination thereof. If implemented in hardware, the functions may be implemented in one or more microprocessors, microcontrollers, digital signal processors (DSPs), application specific integrated circuits (ASICs), field programmable gate arrays (FPGAs), or the like. Such components may reside within a communication system, data writing and/or reading system, or other systems. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various embodiments of the invention have been described. These and other embodiments are within the scope of the following claims.

The invention claimed is:

1. A method comprising:
   maintaining a non-deterministic finite automaton (NFA) representation that includes a plurality of nodes, wherein the NFA representation represents an NFA that detects whether a symbol stream conforms to a symbol pattern defined by a regular expression;
   receiving a symbol stream;
   maintaining a set of node vectors within a hardware-based pattern matching module, wherein each of the node vectors is associated a different symbol position of the symbol stream, and wherein each of the node vectors includes a plurality of elements to specify nodes in the NFA representation to be evaluated with respect to a symbol in the symbol stream at the symbol positions associated with the respective node vector;

processing the symbol stream with the hardware-based pattern matching module to determine whether the symbol stream conforms to the symbol pattern defined by the regular expression, wherein processing the system stream comprises:
assigning a first node specified by a first one of the node vectors to a first thread of the hardware-based pattern matching module when the first thread is idle, and
assigning a second node specified by a second one of the node vectors to a second thread of the hardware-based pattern matching module when the second thread is idle;
evaluating, with the first thread using the first one of the node vectors, the first node of the NFA representation with respect to a symbol at a first symbol position of the symbol stream while concurrently evaluating, with the second thread using the second one of the node vectors, a second node of the NFA representation with respect to a symbol at a second symbol position of the symbol stream,
wherein evaluating the first node includes determining, with the first thread, whether the first node maps the symbol at the first symbol position to a third node in the NFA representation and, responsive to the determination, updating the second one of the node vectors to specify the third node as an unevaluated node; and
communicating data in the symbol stream via a computer network when the symbol stream does not conform to the pattern defined by the regular expression.

2. The method of claim 1, wherein the pattern is associated with a computer security threat.

3. The method of claim 1, wherein maintaining a set of node vectors comprises storing in the one of elements of the node vectors a node index that indicates a node in the NFA representation.

4. The method of claim 1, wherein determining whether the symbol stream conforms to the symbol pattern comprises:
evaluating, with the second thread, the third node of the NFA representation with respect to the symbol at the second symbol position of the symbol stream in accordance with the updated second one of the node vectors.

5. The method of claim 4,
wherein the second one of the node vectors specifies the second node of the NFA representation;
wherein a third one of the node vectors is associated with a third symbol position that immediately follows the second symbol position in the symbol stream; and
wherein determining whether the symbol stream conforms to the symbol pattern further comprises updating, with the second thread, a third one of the node vectors such that the third one of the node vectors specifies a fourth node in the NFA representation when the second thread determines that the second node maps a symbol in the symbol stream at the second symbol position to the fourth node.

6. The method of claim 1, wherein determining whether the symbol stream conforms to the symbol pattern comprises:
maintaining a symbol window that defines a sequential set of symbol positions of the symbol stream; and
assigning a node specified by one of the node vectors to the first thread when the one of the node vectors is associated with a symbol position within the symbol window.

7. The method of claim 6,
wherein determining whether the symbol stream conforms to the symbol pattern comprises advancing the symbol window when all nodes specified by a first one of the node vectors are evaluated,
wherein, prior to advancing, the first one of the node vectors is associated with a symbol position that comes before each symbol position associated with other ones of the node vectors, and
wherein, after the symbol window is advanced, the first one of the node vectors is associated with a symbol position that follows a last symbol position in the symbol window.

8. The method of claim 6,
wherein determining whether the symbol stream conforms to the symbol pattern comprises advancing the symbol window when all nodes specified by a first one of the node vectors are evaluated,
wherein, prior to advancing, the first one of the node vectors is associated with a symbol position that comes before each symbol position associated with other ones of the node vectors, and
wherein advancing the symbol window comprises causing the first one of the node vectors to specify an unanchored node in the NFA representation.

9. The method of claim 1,
wherein the first node includes a set of symbol elements and a next-state element,
wherein each symbol element in the set of symbol elements indicates one or more symbols,
wherein the next-state element indicates a state in NFA; and
wherein the first node maps the symbols indicated by the symbol elements to the state in the NFA indicated by the next-state element.

10. The method of claim 9,
wherein the first thread evaluates the first node with respect to a first symbol in the symbol stream, and
wherein determining whether the symbol stream conforms to the symbol pattern comprises determining, with the first thread, whether the first symbol is one of the symbols indicated by the symbol elements.

11. The method of claim 9,
wherein the next-state element indicates an accepting state in the NFA by specifying a pattern identifier that indicates the pattern defined by the regular expression; and
wherein the next-state element indicates a non-accepting state in the NFA by specifying a node index of a node in the NFA representation.

12. The method of claim 11, wherein the method further comprises outputting, with the first thread, a pattern identifier when the next-state element specifies the pattern identifier and a first symbol in the symbol stream is one of the symbols indicated by the symbol elements.

13. The method of claim 9, wherein one of the symbol elements indicates a meta-symbol that describes a class of symbols.

14. The method of claim 9,
wherein the first thread evaluates the first node with respect to a first symbol;
wherein the first node specifies an epsilon transition to a third node in the NFA representation;
wherein the epsilon transition specified by the first node represents a mapping from an empty string to the third node;
wherein the first nodes specifies an epsilon-bar flag;
wherein determining whether the symbol stream conforms to the symbol pattern comprises evaluating the third node only when the first symbol is not one of the symbols indicated by the symbol elements.

15. The method of claim 9,
wherein the first thread evaluates the first node with respect to a first symbol,
wherein a first set of one or more nodes in the NFA representation are linked to the first node through epsilon transitions, and
wherein determining whether the symbol stream conforms to the symbol pattern comprises determining, with the first thread in a single operation, whether the first node and the nodes in the first set of nodes map the first symbol to other nodes in the NFA representation.

16. The method of claim 15,
wherein the first set of nodes linked to the first node through epsilon transitions includes a third node; and
wherein determining whether any nodes in the first set of nodes map the first symbol to other nodes comprises:
determining, with the first thread, whether the first node maps the first symbol to a fourth node; and
determining, with the first thread, whether the third node maps the first symbol to a fifth node in the NFA representation.

17. The method of claim 15, wherein maintaining the NFA representation comprises storing the third node in a memory module at a memory location that immediately follows a memory location at which the first node is stored.

18. The method of claim 9,
wherein the first thread evaluates the first node with respect to a first symbol,
wherein the first node and a sixth node in the NFA are stored in consecutive memory locations, and
wherein determining whether the symbol stream conforms to the symbol pattern comprises evaluating the first node and the sixth node in a single operation when the first node maps the first symbol to the sixth node.

19. The method of claim 1,
wherein maintaining the NFA representation comprises maintaining a map node in the NFA representation,
wherein the map node provides, for each symbol in a set of symbols, a mapping from the symbol to a next-state element in a set of next-state elements in the map node, and
wherein each of the next-state elements indicates either an accepting or a non-accepting state in the NFA,
wherein non-accepting states are represented the NFA representation as nodes, and
wherein accepting states are represented in the NFA representation as pattern identifiers within the next-state elements.

20. The method of claim 19, wherein the map node is formatted using a bitmap encoding scheme that uses run-length compression.

21. The method of claim 19,
the first thread evaluates the first node with respect to a first symbol in the symbol stream; and
wherein determining whether the symbol stream conforms to the symbol pattern comprises determining, when the first node is the map node, which one of the next-state elements in the map node is mapped to a current symbol by the map node.

22. A device comprising:
a memory unit that stores a non-deterministic finite automaton (NFA) representation that includes a plurality of nodes, wherein the NFA representation represents an NFA that detects whether a symbol stream conforms to a symbol pattern defined by a regular expression;
a pattern matching module that processes the symbol stream to determines whether the symbol stream conforms to the symbol pattern defined by the regular expression by concurrently evaluating a first node of the NFA representation with a first thread of the pattern matching module and evaluating a second node of the NFA representation with a second thread of the pattern matching module,
an arbiter that assigns nodes specified by the node vectors to the first thread or the second thread when the respective thread is idle,
wherein the pattern matching module comprises a plurality of node vectors that are each associated with a different symbol position of the symbol stream, and wherein each of the node vectors stores a plurality of elements that specify nodes in the NFA representation to be evaluated with respect to a symbol in the symbol stream at the symbol positions associated with the respective node vector,
wherein the first thread of the pattern matching module uses a first one of the node vectors to evaluate a first node of the NFA representation with respect to a symbol at a first symbol position of the symbol stream while the second thread of the hardware-based pattern matching module uses a second one of the node vectors to evaluate a second node of the NFA representation with respect to a symbol at a second symbol position of the symbol stream,
wherein, when evaluating the first node, the first thread determines whether the first node maps the first symbol in the symbol stream to a third node in the NFA representation and, responsive to the determination, updates the second one of the node vectors to specify the third node as an unevaluated node; and
a network interface that communicates data in the symbol stream via a computer network when the symbol stream does not conform to the pattern defined by the regular expression.

23. The device of claim 22, wherein the symbol pattern is associated with a computer security threat.

24. The device of claim 22,
wherein the second thread evaluates the third node of the NFA representation with respect to the symbol at the second symbol position of the symbol stream in accordance with the updated second one of the node vectors.

25. The device of claim 22, wherein the arbiter assigns a node specified by one of the node vectors when the one of the node vectors is associated with a symbol position that is within a symbol window, wherein the symbol window includes a plurality of consecutive symbol positions of the symbol stream.

26. The device of claim 25,
wherein the arbiter advances the symbol window when all nodes specified by a first one of the node vectors are evaluated,
wherein, prior to advancing the symbol window, the first one of the node vectors is associated with a symbol position that comes before each symbol positions associated with other ones of the node vectors, and
wherein, after the symbol window is advanced, the first one of the node vectors is associated with a symbol position that follows a last symbol position in the symbol window.

27. The device of claim 26,
wherein the arbiter advances the symbol window when all nodes specified by a first one of the node vectors are evaluated,
wherein, prior to advancing the symbol window, the first one of the node vectors is associated with a symbol position that comes before each symbol positions associated with other ones of the node vectors, and wherein when the arbiter advances the symbol window, the arbiter causes the first one of the node vectors to specify an unanchored node in the NFA representation.

28. The device of claim 22,
wherein the first node includes a set of symbol elements and a next-state element
wherein each symbol element in the set of symbol elements indicates one or more symbols,
wherein the next-state element indicates a state in NFA; and
wherein the first node maps the symbols indicated by the symbol elements to the state in the NFA indicated by the next-state element.

29. The device of claim 28, wherein, when the first node is the first node, the first thread determines whether the first node maps the first symbol to the second node by determining whether the first symbol is one of the symbols indicated by the symbol elements.

30. The device of claim 28,
wherein the next-state element indicates an accepting state in the NFA by specifying a pattern identifier that indicates the pattern defined by the regular expression; and
wherein the next-state element indicates a non-accepting state in the NFA by specifying a node index of a node in the NFA representation.

31. The device of claim 30,
wherein the device further comprises a results buffer; and
wherein, when the next-state element specifies a pattern identifier, the first thread outputs the pattern identifier to the results buffer when a first symbol in the symbol stream is one of the symbols indicated by the symbol elements.

32. The device of claim 30,
wherein the first thread evaluates the first node with respect to a first symbol;
wherein the first node specifies an epsilon transition to a third node in the NFA representation;
wherein the first nodes specifies an epsilon-bar flag;
wherein the first thread evaluates the third node only when the first symbol is not one of the symbols indicated by the symbol elements.

33. The device of claim 28,
wherein the first node is linked to a first set of one or more nodes in the NFA representation through epsilon transitions;
wherein the first thread determines, in a single operation, whether the first node and nodes in the first set of nodes map the first symbol to other nodes in the NFA representation.

34. The device of claim 33,
wherein the first set of nodes linked to the first node through epsilon transitions includes a third node; and
wherein the first thread determines whether the first node and nodes in the first set of nodes map the first symbol to other nodes in the NFA representation in part by determining whether the first node maps the first symbol to a fourth node and by determining whether the third node maps the first symbol to a fifth node in the NFA representation.

35. The device of claim 28,
wherein the first thread evaluates the first node with respect to a first symbol,
wherein the first node and a sixth node in the NFA are stored in consecutive memory locations, and wherein the first thread determines whether the symbol stream conforms to the symbol pattern in part by evaluating the first node and the sixth node in a single operation when the first node maps the first symbol to the sixth node.

36. The device of claim 22,
wherein the NFA representation comprises a map node that provides, for each symbol in a set of symbols, a mapping from the symbol to a next-state element in a set of next-state elements in the map node; and
wherein each of the next-state elements indicate an accepting or a non-accepting state in the NFA,
wherein non-accepting states are represented the NFA representation as nodes, and
wherein accepting states are represented in the NFA representation as pattern identifiers within the next-state elements.

37. The device of claim 36,
wherein the first thread evaluates the first node with respect to a first symbol in the symbol stream; and
wherein, when the first node is the map node, the first thread determines whether the first node maps the first symbol to a third node in the NFA representation by determining which one of the next-state elements in the map node is mapped to the first symbol by the map node.

38. A non-transitory computer-readable medium comprising instructions, wherein the instructions cause a programmable processor to:
maintain a non-deterministic finite automaton (NFA) representation that includes a plurality of nodes, wherein the NFA representation represents an NFA that detects whether a symbol stream conforms to a symbol pattern defined by a regular expression;
receive a symbol stream;
maintain a set of node vectors within a hardware-based pattern matching module, wherein each of the node vectors is associated a different symbol position of the symbol stream, and wherein each of the node vectors includes a plurality of elements to specify nodes in the NFA representation to be evaluated with respect to a symbol in the symbol stream at the symbol positions associated with the respective node vector;
process the symbol stream with the hardware-based pattern matching module to determine whether the symbol stream conforms to the symbol pattern defined by the regular expression by:
assigning a first node specified by a first one of the node vectors to a first thread of the hardware-based pattern matching module when the first thread is idle, and
assigning a second node specified by a second one of the node vectors to a second thread of the hardware-based pattern matching module when the second thread is idle;
evaluating, with the first thread using the first one of the node vectors, the first node of the NFA representation with respect to a symbol at a first symbol position of the symbol stream while concurrently evaluating, with the second thread using the second one of the node vectors, a second node of the NFA representation with respect to a symbol at a second symbol position of the symbol stream,
wherein evaluating the first node includes determining, with the first thread, whether the first node maps the symbol at the first symbol position to a third node in the NFA representation and, responsive to the determination, updating the second one of the node vectors to specify the third node as an unevaluated node; and communicate data in the symbol stream via a computer network when the symbol stream does not conform to the pattern defined by the regular expression.

\* \* \* \* \*